US010059033B2

(12) United States Patent
Wittbold et al.

(10) Patent No.: US 10,059,033 B2
(45) Date of Patent: Aug. 28, 2018

(54) CEMENTITIOUS SLURRY MIXING AND DISPENSING SYSTEM WITH PULSER ASSEMBLY AND METHOD FOR USING SAME

(71) Applicant: United States Gypsum Company, Chicago, IL (US)

(72) Inventors: James R. Wittbold, Des Plaines, IL (US); Chris C. Lee, Deerfield, IL (US); William J. Rago, Gurnee, IL (US)

(73) Assignee: United States Gypsum Company, Chicago, IL (US)

( * ) Notice: Subject to any disclaimer, the term of this patent is extended or adjusted under 35 U.S.C. 154(b) by 526 days.

(21) Appl. No.: 14/548,127

(22) Filed: Nov. 19, 2014

(65) Prior Publication Data

US 2015/0231799 A1 Aug. 20, 2015

Related U.S. Application Data

(60) Provisional application No. 61/941,472, filed on Feb. 18, 2014.

(51) Int. Cl.

| | |
|---|---|
| ***B23B 19/00*** | (2006.01) |
| ***B28B 19/00*** | (2006.01) |
| ***B05C 5/02*** | (2006.01) |

(52) U.S. Cl.

CPC ........ *B28B 19/0092* (2013.01); *B05C 5/0254* (2013.01)

(58) Field of Classification Search

CPC ...... B01F 11/0042; F04B 43/02; F04B 3/021; F04B 3/08; F04B 43/12; B28B 19/0092; B05C 5/0254

USPC ..................................... 417/477.12; 366/275

See application file for complete search history.

(56) References Cited

U.S. PATENT DOCUMENTS

| | | | |
|---|---|---|---|
| 1,452,702 | A | 4/1923 | Pipe |
| 1,905,733 | A | 4/1933 | Moore |
| 2,097,613 | A | 11/1937 | Batcheller |
| 2,203,072 | A | 6/1940 | Albright |

(Continued)

FOREIGN PATENT DOCUMENTS

| | | | |
|---|---|---|---|
| AT | 402826 | B | 7/1997 |
| CN | 1954166 | A | 4/2007 |

(Continued)

OTHER PUBLICATIONS

U.S. Appl. No. 13/341,016, filed Dec. 30, 2011.

(Continued)

*Primary Examiner* — Anshu Bhatia

(74) *Attorney, Agent, or Firm* — Leydig, Voit & Mayer, Ltd.; Philip T. Petti; Pradip K. Sahu

(57) ABSTRACT

A cementitious slurry mixing and dispensing system includes a mixer, a discharge conduit, and a pulser assembly. The discharge conduit is in fluid communication with the mixer. The pulser assembly is adapted to periodically compress a portion of the discharge conduit. The pulser assembly can include a compression member adapted to contactingly engage the portion of the discharge conduit and a drive mechanism adapted to selectively move the compression member into compressing engagement with the discharge conduit such that the part of the interior wall surface underlying the compressed portion is flexed.

20 Claims, 18 Drawing Sheets

(56) References Cited

U.S. PATENT DOCUMENTS 2,660,416 A 11/1953 Camp et al.
2,700,622 A 1/1955 Burwell
2,882,716 A 4/1959 Anderson
2,998,198 A 8/1961 Young
3,053,314 A 9/1962 McGillis et al.
3,083,756 A 4/1963 Page
3,196,864 A 7/1965 Johnson
3,198,867 A 8/1965 Siggers
3,266,974 A 8/1966 Staver
3,296,346 A 1/1967 Shannon
3,297,601 A 1/1967 Ptasieaski et al.
3,359,146 A 12/1967 Lane et al.
3,363,769 A 1/1968 Wilmot et al.
3,380,333 A 4/1968 Clay et al.
3,400,190 A 9/1968 Donald
3,415,920 A 12/1968 Lee et al.
3,432,588 A 3/1969 Breidt et al.
3,437,172 A 4/1969 Allen
3,458,907 A 8/1969 Shannon
3,459,620 A 8/1969 McCleary et al.
3,467,281 A 9/1969 Archer
3,494,993 A 2/1970 Breidt et al.
3,532,781 A 10/1970 Shannon
3,558,380 A 1/1971 Pook
3,583,681 A 6/1971 Brown
3,602,405 A 8/1971 Ames
3,644,169 A 2/1972 Phillips
3,663,562 A 5/1972 Magerlein et al.
3,740,027 A 6/1973 Kormos
3,760,036 A 9/1973 Matthews
3,781,320 A 12/1973 Irwin
3,795,259 A 3/1974 Brandin et al.
3,841,530 A 10/1974 Janninck
3,909,170 A 9/1975 Riboulet et al.
3,959,431 A 5/1976 Nissel
3,959,432 A 5/1976 Wiley
4,110,061 A * 8/1978 Gerritsen ............ F04B 43/0072
138/137
4,113,829 A 9/1978 Bowker et al.
4,153,403 A 5/1979 Schneider
4,175,591 A 11/1979 Welker
4,181,647 A 1/1980 Beach
4,187,275 A 2/1980 Bracalielly et al.
4,190,144 A 2/1980 Lybbert
4,268,236 A 5/1981 Peille et al.
4,279,673 A 7/1981 White et al.
4,288,263 A 9/1981 Delcoigne et al.
4,334,786 A 6/1982 Delcoigne et al.
4,354,885 A 10/1982 White
4,361,254 A 11/1982 Teraoku et al.
4,364,790 A 12/1982 Delcoigne et al.
4,392,613 A 7/1983 Graff et al.
4,474,477 A 10/1984 Smith et al.
4,533,300 A 8/1985 Westerlund et al.
4,557,261 A 12/1985 Rugheimer
4,588,299 A 5/1986 Brown et al.
4,618,294 A 10/1986 Brown
4,664,611 A 5/1987 Kumar
4,758,261 A 7/1988 Parker et al.
4,819,878 A 4/1989 Bailey et al.
4,827,921 A 5/1989 Rugheimer
4,934,596 A 6/1990 Hilton et al.
4,942,003 A 7/1990 Bold
5,188,455 A * 2/1993 Hammerstedt ..... B01F 11/0042
137/896
5,192,384 A 3/1993 Barrier et al.
5,211,511 A 5/1993 Deal, Jr.
5,211,965 A 5/1993 Kitagawa
5,261,485 A 11/1993 Thornton et al.
5,316,703 A 5/1994 Schrenk
5,320,677 A 6/1994 Baig
5,350,290 A 9/1994 Honings
5,386,943 A 2/1995 Peeters
5,395,653 A 3/1995 Baum
5,508,072 A 4/1996 Andersen et al.
5,520,779 A 5/1996 Bold
5,580,409 A 12/1996 Andersen et al.
5,582,670 A 12/1996 Andersen et al.
5,622,729 A 4/1997 Mower
5,643,510 A 7/1997 Sucech
5,660,903 A 8/1997 Andersen et al.
5,660,904 A 8/1997 Andersen et al.
5,665,442 A 9/1997 Andersen et al.
5,679,381 A 10/1997 Andersen et al.
5,683,635 A 11/1997 Sucech et al.
5,709,593 A 1/1998 Guthrie et al.
5,714,001 A 2/1998 Savoly et al.
5,718,797 A 2/1998 Phillips et al.
5,720,913 A 2/1998 Andersen et al.
5,730,819 A 3/1998 Retti
5,766,525 A 6/1998 Andersen et al.
5,792,322 A 8/1998 Hergert et al.
5,794,642 A 8/1998 Zikeli et al.
5,800,647 A 9/1998 Andersen et al.
5,844,051 A 12/1998 Onzuka et al.
5,879,486 A 3/1999 Philips et al.
5,879,722 A 3/1999 Andersen et al.
5,908,240 A 6/1999 Hood et al.
5,972,426 A 10/1999 Kutsuzawa et al.
5,997,691 A 12/1999 Gautam et al.
6,057,000 A 5/2000 Cai
6,059,444 A 5/2000 Johnson et al.
6,123,445 A 9/2000 Grassi
6,153,040 A 11/2000 Rohlf et al.
6,154,947 A 12/2000 Koebbe
6,176,036 B1 1/2001 Pease
6,276,946 B1 8/2001 Stephan
6,286,422 B1 9/2001 Lin et al.
6,323,159 B1 11/2001 Raza
6,340,123 B1 1/2002 Lee et al.
6,342,284 B1 1/2002 Yu et al.
6,363,967 B1 4/2002 Tanaka et al.
6,382,922 B1 5/2002 Lewis et al.
6,402,062 B1 6/2002 Bendig et al.
6,409,823 B1 6/2002 Shake et al.
6,416,695 B1 7/2002 Miller
6,427,877 B1 8/2002 Trout
6,471,799 B1 10/2002 Sasaki et al.
6,494,609 B1 12/2002 Wittbold et al.
6,524,388 B1 2/2003 Yamada et al.
6,616,985 B2 9/2003 Powell et al.
6,632,550 B1 10/2003 Yu et al.
6,635,214 B2 10/2003 Rapacki et al.
6,645,483 B2 11/2003 McGhee
6,699,364 B2 3/2004 Song et al.
6,699,426 B1 3/2004 Burke
6,752,895 B1 6/2004 Song et al.
6,774,146 B2 8/2004 Savoly et al.
6,800,131 B2 10/2004 Yu et al.
6,872,280 B2 3/2005 Tanaka et al.
6,874,930 B2 4/2005 Wittbold et al.
6,878,321 B2 4/2005 Hauber et al.
6,991,361 B2 1/2006 Flood
7,007,914 B2 3/2006 Petersen et al.
7,127,865 B2 10/2006 Douglas
7,160,389 B2 1/2007 Gibson et al.
7,172,403 B2 2/2007 Burke
7,255,123 B2 8/2007 Cedergaard et al.
7,296,919 B2 * 11/2007 Petersen ................... F16K 7/06
366/192
7,364,676 B2 4/2008 Sucech
7,458,532 B2 12/2008 Sloan
7,475,599 B2 1/2009 Frank et al.
7,588,634 B2 9/2009 Lynn et al.
7,690,834 B2 4/2010 Nakamura et al.
7,718,019 B2 5/2010 Wittbold et al.
7,731,794 B2 6/2010 Yu et al.
7,736,720 B2 6/2010 Yu et al.
7,771,851 B2 8/2010 Song et al.
7,875,114 B2 1/2011 Wittbold et al.
7,875,192 B2 1/2011 Eigenmann et al.
7,980,922 B2 7/2011 Kiesel et al.
8,016,960 B2 9/2011 Wittbold et al.
8,030,377 B2 10/2011 Dubey et al.

(56) References Cited

U.S. PATENT DOCUMENTS

| | | | |
|---|---|---|---|
| 8,038,790 | B1 | 10/2011 | Dubey et al. |
| 8,057,915 | B2 | 11/2011 | Song et al. |
| 8,062,741 | B2 | 11/2011 | Tonyan et al. |
| 8,088,218 | B2 | 1/2012 | Blackburn et al. |
| 8,119,207 | B2 | 2/2012 | Rigaudon et al. |
| 8,128,126 | B2 | 3/2012 | Poupore et al. |
| 8,142,859 | B2 | 3/2012 | Domey et al. |
| 8,142,915 | B2 | 3/2012 | Blackburn et al. |
| 8,177,541 | B2 | 5/2012 | Fahey |
| 8,197,952 | B2 | 6/2012 | Yu et al. |
| 8,257,489 | B2 | 9/2012 | Yu et al. |
| 8,360,825 | B2 | 1/2013 | Hsu et al. |
| 8,444,787 | B2 | 5/2013 | Wittbold et al. |
| 8,475,762 | B2 | 7/2013 | Li et al. |
| 8,597,426 | B2 | 12/2013 | Lee et al. |
| 8,685,188 | B2 | 4/2014 | Yamaji |
| 8,801,852 | B2 | 8/2014 | Lee et al. |
| 9,296,124 | B2 | 3/2016 | Rago et al. |
| 2002/0045074 | A1 | 4/2002 | Yu et al. |
| 2002/0056690 | A1 | 5/2002 | Wegner |
| 2003/0049450 | A1 | 3/2003 | Song et al. |
| 2003/0068959 | A1 | 4/2003 | Kajiwara et al. |
| 2003/0117891 | A1 | 6/2003 | Wittbold et al. |
| 2003/0200714 | A1 | 10/2003 | Minke et al. |
| 2004/0033314 | A1 | 2/2004 | Rao et al. |
| 2004/0033324 | A1 | 2/2004 | Meyer |
| 2004/0091406 | A1 | 5/2004 | Wolfert et al. |
| 2004/0231916 | A1 | 11/2004 | Englert et al. |
| 2005/0019618 | A1 | 1/2005 | Yu et al. |
| 2005/0103347 | A1 | 5/2005 | Curti et al. |
| 2005/0253098 | A1 | 11/2005 | Petersen et al. |
| 2006/0035112 | A1 | 2/2006 | Veeramasuneni et al. |
| 2006/0045975 | A1* | 3/2006 | Yamaji ................ B28B 19/0015 427/355 |
| 2006/0092759 | A1 | 5/2006 | Petersen et al. |
| 2006/0198995 | A1 | 9/2006 | Nideborn et al. |
| 2006/0243171 | A1 | 11/2006 | Yu et al. |
| 2006/0244182 | A1 | 11/2006 | Wittbold et al. |
| 2006/0244183 | A1 | 11/2006 | Wittbold et al. |
| 2006/0278133 | A1 | 12/2006 | Yu et al. |
| 2006/0283974 | A1 | 12/2006 | Eguchi et al. |
| 2007/0022913 | A1 | 2/2007 | Wang et al. |
| 2007/0048490 | A1 | 3/2007 | Yu et al. |
| 2007/0048549 | A1 | 3/2007 | Song et al. |
| 2007/0059513 | A1 | 3/2007 | Yu et al. |
| 2007/0251628 | A1 | 11/2007 | Yu et al. |
| 2008/0000392 | A1 | 1/2008 | Blackburn et al. |
| 2008/0009565 | A1 | 1/2008 | Wittbold et al. |
| 2008/0069762 | A1 | 3/2008 | Lynn et al. |
| 2008/0090068 | A1 | 4/2008 | Yu et al. |
| 2008/0110276 | A1 | 5/2008 | Frank et al. |
| 2008/0141909 | A1 | 6/2008 | Immordino et al. |
| 2008/0299413 | A1 | 12/2008 | Song et al. |
| 2009/0090796 | A1 | 4/2009 | Tian |
| 2009/0134550 | A1 | 5/2009 | Dehennau et al. |
| 2009/0239977 | A1 | 9/2009 | Dubey et al. |
| 2009/0257303 | A1 | 10/2009 | Rayner et al. |
| 2009/0297765 | A1 | 12/2009 | Domey et al. |
| 2010/0077939 | A1 | 4/2010 | Trout |
| 2010/0081008 | A1 | 4/2010 | Trout |
| 2010/0139528 | A1 | 6/2010 | Yu et al. |
| 2010/0227073 | A1 | 9/2010 | Frank et al. |
| 2010/0229714 | A1 | 9/2010 | Tonyan et al. |
| 2010/0239886 | A1 | 9/2010 | Yu et al. |
| 2010/0291305 | A1 | 11/2010 | Wittbold et al. |
| 2011/0054053 | A1 | 3/2011 | Lee et al. |
| 2011/0186664 | A1 | 8/2011 | Lucas et al. |
| 2011/0192518 | A1 | 8/2011 | Li |
| 2011/0195241 | A1 | 8/2011 | Yu et al. |
| 2011/0211418 | A1 | 9/2011 | Tassone et al. |
| 2011/0213043 | A1 | 9/2011 | Blackburn et al. |
| 2011/0213085 | A1 | 9/2011 | Tonelli et al. |
| 2011/0220586 | A1 | 9/2011 | Levitt |
| 2011/0271903 | A1 | 11/2011 | Durst et al. |
| 2011/0308432 | A1 | 12/2011 | Wittbold et al. |
| 2012/0131857 | A1 | 5/2012 | Ross-da Silva |
| 2012/0167805 | A1 | 7/2012 | Wittbold et al. |
| 2012/0168527 | A1 | 7/2012 | Li et al. |
| 2012/0170403 | A1 | 7/2012 | Li et al. |
| 2012/0251813 | A1 | 10/2012 | Yu et al. |
| 2012/0304545 | A1 | 12/2012 | Park et al. |
| 2012/0308463 | A1 | 12/2012 | Li et al. |
| 2013/0098268 | A1 | 4/2013 | Li et al. |
| 2013/0099027 | A1 | 4/2013 | Li et al. |
| 2013/0099418 | A1 | 4/2013 | Li et al. |
| 2013/0100759 | A1 | 4/2013 | Wittbold et al. |
| 2013/0216717 | A1 | 8/2013 | Rago et al. |
| 2013/0233880 | A1 | 9/2013 | Rago et al. |
| 2013/0308411 | A1 | 11/2013 | Wittbold et al. |
| 2014/0073711 | A1 | 3/2014 | Lee et al. |
| 2014/0090730 | A1 | 4/2014 | Buettner et al. |
| 2015/0231799 | A1 | 8/2015 | Wittbold et al. |
| 2017/0210029 | A1 | 7/2017 | Li et al. |

FOREIGN PATENT DOCUMENTS

| | | | |
|---|---|---|---|
| CN | 2928447 | Y | 8/2007 |
| CN | 201685321 | U | 12/2010 |
| CN | 204076480 | U | 1/2015 |
| CN | 203957095 | U | 11/2016 |
| DE | 353695 | | 5/1922 |
| DE | 3808698 | A1 | 9/1989 |
| DE | 3932573 | A1 | 4/1991 |
| DE | 29514043 | U1 | 11/1995 |
| DE | 19757678 | A1 | 6/1999 |
| DE | 102008041423 | A1 | 2/2010 |
| DE | 202009014417 | U1 | 2/2010 |
| DE | 202011100879 | U1 | 6/2011 |
| DE | 102010010872 | A1 | 9/2011 |
| EP | 0003705 | | 2/1979 |
| EP | 0225261 | A1 | 6/1987 |
| EP | 0997784 | A1 | 5/2000 |
| EP | 1085280 | A1 | 3/2001 |
| EP | 1396696 | A2 | 3/2004 |
| EP | 1491262 | A2 | 12/2004 |
| EP | 2363269 | A1 | 9/2011 |
| EP | 2514294 | | 10/2012 |
| FR | 1357221 | | 4/1964 |
| FR | 2112808 | A5 | 6/1972 |
| GB | 1317359 | A | 5/1973 |
| GB | 1420686 | | 1/1976 |
| GB | 1520258 | A | 8/1978 |
| GB | 2026372 | A | 2/1980 |
| GB | 2044163 | A | 10/1980 |
| GB | 2246694 | A | 2/1992 |
| GB | 2410909 | | 8/2005 |
| JP | 51-90356 | U | 7/1976 |
| JP | 6190845 | A | 7/1994 |
| JP | H0-752130 | A | 2/1995 |
| JP | H0-788419 | A | 4/1995 |
| JP | H08-281626 | A | 10/1996 |
| JP | 9094814 | A | 4/1997 |
| JP | H09141700 | A | 6/1997 |
| JP | 9273421 | A | 10/1997 |
| JP | H11-501002 | A | 1/1999 |
| JP | 11148589 | | 6/1999 |
| JP | H11-170235 | A | 6/1999 |
| JP | H11-188301 | A | 7/1999 |
| JP | 2001-062821 | A | 3/2001 |
| JP | 2001-300933 | A | 10/2001 |
| JP | 2004130672 | | 4/2004 |
| JP | 2005-021894 | A | 1/2005 |
| JP | 2005-211871 | A | 8/2005 |
| JP | 2006095469 | A | 4/2006 |
| JP | 2006334483 | A | 12/2006 |
| JP | 2008-229560 | A | 10/2008 |
| JP | 2009-045513 | A | 3/2009 |
| RU | 2257294 | A | 5/2005 |
| RU | 2313451 | C2 | 12/2007 |
| TW | I350228 | B | 10/2011 |
| WO | WO 1993024290 | | 12/1993 |
| WO | WO 97/05305 | A1 | 2/1997 |
| WO | WO 98/25069 | A1 | 6/1998 |
| WO | WO 2004/101402 | A1 | 11/2004 |

(56) References Cited

FOREIGN PATENT DOCUMENTS

| | | | |
|---|---|---|---|
| WO | WO 2010/142034 | A1 | 12/2010 |
| WO | WO 2011134844 | A1 | 11/2011 |
| WO | WO 2011150455 | A1 | 12/2011 |
| WO | WO 2012076526 | | 6/2012 |
| WO | WO 2012/092534 | A1 | 7/2012 |
| WO | WO 2012/092582 | A1 | 7/2012 |
| WO | WO 2013/063044 | A1 | 5/2013 |
| WO | WO 2013/063055 | A2 | 5/2013 |
| WO | WO 2013/063073 | A2 | 5/2013 |
| WO | WO 2013/063080 | A2 | 5/2013 |
| WO | WO 2013/063055 | A3 | 6/2013 |
| WO | WO 2014/066211 | A1 | 5/2014 |
| WO | WO 2014/066283 | A1 | 5/2014 |

OTHER PUBLICATIONS

U.S. Appl. No. 13/241,209, filed Dec. 30, 2011.
U.S. Appl. No. 13/659,423, filed Oct. 24, 2012.
U.S. Appl. No. 13/659,516, filed Oct. 24, 2012.
U.S. Appl. No. 13/659,600, filed Oct. 24, 2012.
U.S. Appl. No. 13/659,672, filed Oct. 24, 2012.
U.S. Appl. No. 13/844,133, filed Mar. 15, 2013.
U.S. Appl. No. 13/844,364, filed Mar. 15, 2013.
U.S. Appl. No. 13/844,550, filed Mar. 15, 2013.
European Patent Office, International Search Report and Written Opinion in International Application No. PCT/US2015/015305 (dated Jan. 22, 2015).
U.S. Appl. No. 61/941,472, filed Feb. 18, 2014.
Burrows, "A Decade's Experience of Gypsum Board Weight Reduction in the U.S.", 14. Internationale Baustofftagung (Weimar, Sep. 20-23, 2000), 1.0197-1.0207.
Mueller et al., "Controlling Set Times during Gypsum Board Production: Advance Additive Solutions", Global Gypsum Conference, Oct. 2011.
Peterson, Kurt, "Engineered Gypsum Panels, the Development and Application of Densified Zones at the Paper/Core Interface of Gypsum Panels", Proceedings of Gypsum 2000, 6th International Conference on Natural and Synthetic Gypsum, Toronto, Canada, May 2000, pp. 9-1-9-16.
Teejet; "TeeJet LF 500 Slurry Controller", http://teejet.com/english/home/products/application-control-and-equipment/slurry-application-controls/teejet--lh-500-slurry-controller.aspx, accessed Jan. 8, 2015.

* cited by examiner

CEMENTITIOUS SLURRY MIXING AND DISPENSING SYSTEM WITH PULSER ASSEMBLY AND METHOD FOR USING SAME

CROSS-REFERENCE TO RELATED APPLICATION

This patent application claims the benefit of priority to U.S. Provisional Patent Application No. 61/941,472, filed Feb. 18, 2014, and entitled, "Slurry Distribution System With Pulser Assembly and Method for Using Same," which is incorporated in its entirety herein by this reference.

BACKGROUND

The present disclosure relates to continuous board manufacturing processes and, more particularly, to a system and method for dispensing cementitious slurry in connection with the manufacture of a cementitious article.

In many types of cementitious articles, set gypsum (calcium sulfate dihydrate) is often a major constituent. For example, set gypsum is a major component of end products created by use of traditional plasters (e.g., plaster-surfaced internal building walls), and also in faced gypsum board employed in typical drywall construction of interior walls and ceilings of buildings. In addition, set gypsum is the major component of gypsum/cellulose fiber composite boards and products, as described in U.S. Pat. No. 5,320,677, for example. Also, many specialty materials, such as materials useful for modeling and mold-making, produce products that contain major amounts of set gypsum. Typically, such gypsum-containing cementitious products are made by preparing a mixture of calcined gypsum (calcium sulfate alpha or beta hemihydrate and/or calcium sulfate anhydrite), water, and other components, as appropriate to form cementitious slurry. In the manufacture of cementitious articles, the cementitious slurry and desired additives are often blended in a continuous mixer, as described in U.S. Pat. No. 3,359,146, for example.

In a typical process for manufacturing a cementitious article, such as wallboard, gypsum board is produced by uniformly dispersing calcined gypsum (commonly referred to as "stucco") in water to form aqueous calcined gypsum slurry. The aqueous calcined gypsum slurry is typically produced in a continuous manner by inserting stucco and water and other additives into a mixer which contains means for agitating the contents to form a uniform gypsum slurry. The slurry is continuously directed toward and through a discharge outlet of the mixer and into a discharge conduit connected to the discharge outlet of the mixer. Aqueous foam can be combined with the aqueous calcined gypsum slurry in the mixer and/or in the discharge conduit. A stream of foamed slurry passes through the discharge conduit from which it is continuously deposited onto a moving web of cover sheet material supported by a forming table.

The foamed slurry is allowed to spread over the advancing web. A second web of cover sheet material is applied to cover the foamed slurry and form a sandwich structure of a continuous wallboard preform, which is subjected to forming, such as at a conventional forming station, to obtain a desired thickness.

The calcined gypsum reacts with the water in the wallboard preform and sets as a conveyor moves the wallboard preform down a manufacturing line. The wallboard preform is cut into segments at a point along the line where the preform has set sufficiently. The segments are flipped over, dried (e.g., in a kiln) to drive off excess water, and processed to provide the final wallboard product of desired dimensions. The aqueous foam produces air voids in the set gypsum, thereby reducing the density of the finished product relative to a product made using a similar slurry but without foam. Prior devices and methods for addressing some of the operational problems associated with the production of gypsum wallboard are disclosed in commonly-assigned U.S. Pat. Nos. 5,683,635; 5,643,510; 6,494,609; 6,874,930; 7,007,914; and 7,296,919, which are incorporated by reference.

In conventional arrangements, the discharge conduit can be subject to slurry build up within its interior passageway. This slurry build up can occur at places where the slurry is moving locally at a different rate than the surrounding area, such as at the interior boundary wall defining the slurry passageway through the conduit. Slurry which remains in the discharge conduit can set and harden. Eventually, a lump of the set gypsum can break free and travel downstream in the manufacturing process. The lump can cause a manufacturing upset, such as, a paper tear as the lump travels through the forming station in a drywall manufacturing application, for example.

It will be appreciated that this background description has been created by the inventors to aid the reader and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims and not by the ability of any disclosed feature to solve any specific problem noted herein.

SUMMARY

In one aspect, the present disclosure is directed to embodiments of a slurry dispensing system for use in preparing a cementitious product. In embodiments, a slurry dispensing system can be a part of a cementitious slurry mixing and dispensing system. The slurry dispensing system can comprise a discharge conduit, or at least a part of a discharge conduit, adapted to be placed in fluid communication with a mixer and a pulser assembly adapted to periodically compress a portion of the discharge conduit. The slurry dispensing system can be used to convey a flow of cementitious slurry received from the mixer to a position from which it is discharged from the slurry dispensing system onto a moving web of cover sheet material.

In one embodiment, a slurry dispensing system includes a discharge conduit having a slurry distributor at a terminal end thereof and a pulser assembly adapted to periodically compress a portion of the slurry distributor. The pulser assembly can include a compression member adapted to contactingly engage the portion of the slurry distributor and a drive mechanism adapted to selectively move the compression member into compressing engagement with the slurry distributor.

In another aspect of the present disclosure, embodiments of a slurry mixing and dispensing system are described. In one embodiment, a slurry mixing and dispensing system includes a mixer and a slurry dispensing system.

The mixer is adapted to agitate water and a cementitious material to form aqueous cementitious slurry. The slurry dispensing system is in fluid communication with the mixer. The slurry dispensing system includes a discharge conduit and a pulser assembly adapted to periodically compress a portion of the discharge conduit. The pulser assembly can include a compression member adapted to contactingly engage the portion of the discharge conduit and a drive mechanism adapted to selectively move the compression member into compressing engagement with the discharge conduit.

In one embodiment, a cementitious slurry mixing and dispensing system includes a mixer, a discharge conduit, and a pulser assembly. The mixer is adapted to agitate water and a cementitious material to form aqueous cementitious slurry. The discharge conduit is in fluid communication with the mixer.

The discharge conduit is made from a resiliently flexible material. The discharge conduit extends along a longitudinal axis and has a sidewall portion and an interior wall surface. The interior wall surface defines a slurry passage adapted to convey aqueous cementitious slurry therethrough.

The pulser assembly includes a compression member and a drive mechanism. The compression member extends along the longitudinal axis and is reciprocally movable over a range of travel between a neutral position, in which the compression member contactingly engages the sidewall portion of the discharge conduit, and a compressed position, in which the compression member is in compressing engagement with the discharge conduit such that a portion of the interior wall surface underlying the sidewall portion is flexed. The sidewall portion is more flexed when the compression member is in the compressed position than when in the neutral position. The drive mechanism is adapted to reciprocally move the compression member over the range of travel between the neutral position and the compressed position.

In another aspect of the present disclosure, embodiments of a method of preparing a cementitious product are described. In one embodiment of a method of preparing a cementitious product, a flow of aqueous cementitious slurry is discharged from a mixer. The flow of aqueous cementitious slurry is passed through a feed inlet of a slurry distributor into a slurry passageway defined within the slurry distributor. A portion of the slurry distributor is periodically compressed such that an interior flow geometry of the slurry passageway defined within the portion of the slurry distributor is modified.

In one embodiment of a method of preparing a cementitious product, a flow of aqueous cementitious slurry is discharged from a mixer into a discharge conduit. The flow of aqueous cementitious slurry is passed through a slurry passage defined within the discharge conduit. A sidewall portion of the discharge conduit is periodically compressed such that a portion of the interior wall surface underlying the sidewall portion is flexed.

Further and alternative aspects and features of the disclosed principles will be appreciated from the following detailed description and the accompanying drawings. As will be appreciated, the slurry dispensing systems and techniques disclosed herein are capable of being carried out and used in other and different embodiments, and capable of being modified in various respects. Accordingly, it is to be understood that both the foregoing general description and the following detailed description are exemplary and explanatory only and do not restrict the scope of the appended claims.

Figure 1:
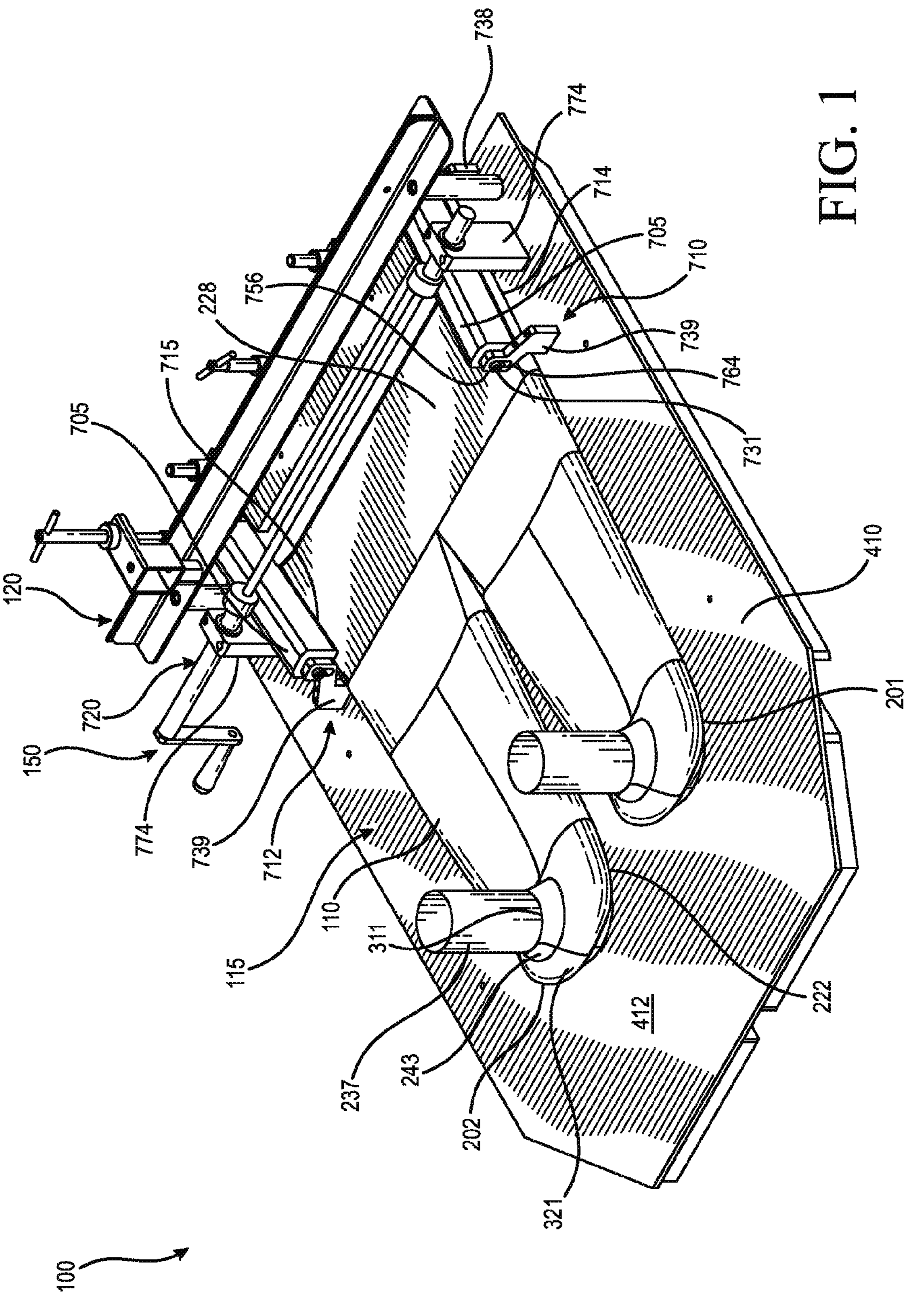
FIG. 1 is a perspective view of an embodiment of a slurry dispensing system constructed in accordance with principles of the present disclosure.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION OF EXEMPLARY EMBODIMENTS

The present disclosure provides various embodiments of a slurry dispensing system that can be used in the manufacture of products, including cementitious products such as gypsum wallboard, for example. Embodiments of a slurry dispensing system constructed in accordance with principles of the present disclosure can be used in a manufacturing process to effectively distribute a multi-phase slurry, such as one containing air and liquid phases, such as found in an aqueous foamed gypsum slurry, for example.

Embodiments of a slurry dispensing system constructed in accordance with principles of the present disclosure are aimed at accomplishing wider distribution (along the cross-machine direction) of a uniform gypsum slurry with less downtime as a result of slurry buildup within a discharge conduit of the slurry dispensing system. Embodiments of a slurry dispensing system of the present disclosure are suitable for use with a gypsum slurry having a water-to-stucco ratio (WSR) over a range of WSRs, including WSRs conventionally used to manufacture gypsum wallboard and those that are relatively lower and have a relatively higher viscosity. Furthermore, embodiments of a gypsum slurry dispensing system following principles of the present disclosure can be used to help control air-liquid phase separation, such as, in aqueous foamed gypsum slurry, including foamed gypsum slurry having a very high foam volume. The spreading of the aqueous calcined gypsum slurry over the advancing web can be controlled by routing and distributing the slurry using embodiments of a dispensing system as shown and described herein.

Embodiments of a slurry dispensing system constructed in accordance with principles of the present disclosure can include a pulser assembly adapted to help reduce the occurrence of slurry buildup inside the discharge conduit. Embodiments of a slurry dispensing system constructed in accordance with principles of the present disclosure can advantageously be configured as a retrofit component of a cementitious slurry mixing and dispensing system, such as one in an existing wallboard manufacturing system, for example.

In embodiments, a slurry dispensing system constructed in accordance with principles of the present disclosure includes a discharge conduit and a pulser assembly. The discharge conduit can be made from a suitable resiliently flexible material. The discharge conduit can define at least one slurry passage adapted to convey cementitious slurry therethrough. The pulser assembly can be adapted to periodically compress a portion of the discharge conduit such that an interior flow geometry defined within the slurry passage of the discharge conduit is modified. The pulser assembly can include a compression member adapted to contactingly engage the portion of the discharge conduit and a drive mechanism adapted to selectively move the compression member into compressing engagement with the discharge conduit. The compression member can be movable over a range of travel between a neutral position and a range of compressing positions, including a maximum compressed position. The drive mechanism can be adapted to reciprocally move the compression member between the neutral position and the maximum compressed position.

In embodiments, an exterior contacting surface of the compression member can have a topography that substantially corresponds with the topography of a portion of an exterior surface of the portion of the discharge conduit with which it is in contacting engagement. The exterior surface of the contacted portion of the discharge conduit, in turn, substantially corresponds to a portion of an interior surface that defines the interior flow geometry of the slurry passage. The compression member can help maintain the interior flow geometry of the discharge conduit in an operational position when the compression member is in the neutral position. The compression member, when in the neutral position, can contactingly support the discharge conduit such that an interior flow geometry of a portion of the slurry passage underlying the compression member is maintained in a configuration.

In embodiments, the pulser assembly includes a compression member which imparts a flow geometry within the slurry passage of the discharge conduit that facilitates the flow of slurry through the slurry distributor when the compression member is in the neutral position. In embodiments, the compression member maintains the flexible discharge conduit within a predetermined volume while maintaining an interior flow geometry within the discharge conduit.

Embodiments of a slurry dispensing system constructed in accordance with principles of the present disclosure can include a discharge conduit having at a terminal end thereof a slurry distributor made from a resiliently flexible material and a pulser assembly adapted to periodically compress a portion of the slurry distributor such that an interior flow geometry defined within the slurry distributor is modified. The pulser assembly can include a compression member adapted to contactingly engage the portion of the slurry distributor and a drive mechanism adapted to selectively move the compression member into compressing engagement with the slurry distributor. In embodiments, the drive mechanism can be operated to periodically drive the compression member into compressing engagement with the portion of the slurry distributor to correspondingly pulse or flex the engaged portion of the slurry distributor. The pulsing movement of the flexible slurry distributor can help prevent slurry buildup inside the slurry distributor.

The present disclosure provides various embodiments of a cementitious slurry mixing and dispensing system that can be used in the manufacture of cementitious products. A cementitious slurry mixing and dispensing system according to principles of the present disclosure can be used to form a multitude of types of cementitious product. In embodiments, a cementitious board—such as, a gypsum wallboard, an acoustical panel, or a portland cement board, for example—, can be formed using an embodiment of a cementitious slurry mixing and dispensing system constructed according to principles of the present disclosure.

Embodiments of a cementitious slurry mixing and dispensing system constructed in accordance with principles of the present disclosure can be used to mix and distribute a cementitious slurry (e.g., an aqueous calcined gypsum slurry) onto an advancing web (e.g., paper or mat) moving on a conveyor during a continuous board (e.g., gypsum wallboard) manufacturing process. In one aspect, a slurry dispensing system constructed in accordance with principles of the present disclosure can be used in a conventional gypsum drywall manufacturing process as, or part of, a discharge conduit in fluid communication with a mixer adapted to agitate calcined gypsum and water to form an aqueous calcined gypsum slurry.

The cementitious slurry can be any conventional cementitious slurry, for example any cementitious slurry, such as those commonly used to produce gypsum wallboard, acoustical panels including, for example, acoustical panels described in U.S. Patent Application Publication No. 2004/0231916, or portland cement board, for example. As such, the cementitious slurry can optionally further comprise any other additives that are commonly used in the production of cementitious products. Such additives include structural additives, including mineral wool, continuous or chopped glass fibers (also referred to as fiberglass), perlite, clay, vermiculite, calcium carbonate, polyester, and paper fiber, as well as chemical additives, such as aqueous foam/foaming agents, fillers, accelerators, sugar, enhancing agents such as phosphates, phosphonates, borates and the like, retarders, binders (e.g., starch and latex), colorants, fungicides, biocides, hydrophobic agent, such as a silicone-based material (e.g., a silane, siloxane, or silicone-resin matrix), and the like. Examples of the use of some of these and other additives are described, for instance, in U.S. Pat. Nos. 6,342,284; 6,632,550; 6,800,131; 5,643,510; 5,714,001; and 6,774,146; and U.S. Patent Application Publication Nos. 2002/0045074; 2004/0231916; 2005/0019618; 2006/0035112; and 2007/0022913.

Non-limiting examples of cementitious materials suitable for use in embodiments following principles of the present disclosure include portland cement, sorrel cement, slag cement, fly ash cement, calcium alumina cement, water-soluble calcium sulfate anhydrite, calcium sulfate α-hemihydrate, calcium sulfate β-hemihydrate, natural, synthetic or chemically modified calcium sulfate hemihydrate, calcium sulfate dihydrate ("gypsum," "set gypsum," or "hydrated gypsum"), and mixtures thereof. In one aspect, the cementitious material desirably comprises calcined gypsum (sometimes referred to as, "stucco"), such as in the form of calcium sulfate alpha hemihydrate, calcium sulfate beta hemihydrate, and/or calcium sulfate anhydrite. The calcined gypsum can be fibrous in some embodiments and nonfibrous in other embodiments. In embodiments, the calcined gypsum can include at least about 50% beta calcium sulfate hemihydrate. In other embodiments, the calcined gypsum can include at least about 86% beta calcium sulfate hemihydrate. The weight ratio of water to calcined gypsum can be any suitable ratio, although, as one of ordinary skill in the art will appreciate, lower ratios can be more efficient because less excess water will remain after the hydration process of the stucco is completed to be driven off during manufacture, thereby conserving energy. In some embodiments, the cementitious slurry can be prepared by combining water and calcined gypsum in a suitable water to stucco weight ratio for board production depending on products, such as, in a range between about 1:6 and about 1:1, e.g., about 2:3.

Turning now to the Figures, an embodiment of a slurry dispensing system 100 constructed according to principles of the present disclosure is shown in FIGS. 1-4. The slurry dispensing system 100 is suitable for use in embodiments of a slurry mixing and dispensing system following principles of the present disclosure. The slurry dispensing system 100 can be adapted to receive a flow of cementitious slurry from a mixer and discharge the slurry therefrom with a reduced velocity. The illustrated slurry dispensing system 100 includes a discharge conduit in the form of a slurry distributor 110 at a terminal end of the discharge conduit, a distributor support assembly 115, a profiling mechanism 120, and a pulser assembly 150.

In embodiments, a discharge conduit constructed in accordance with principles of the present disclosure can be made from any suitable material, including a suitable resiliently flexible material, such as a suitable flexible plastic material, including poly vinyl chloride (PVC) or urethane, for example. Although the illustrated slurry distributor 110 includes a dual feed inlet arrangement, it should be understood that a discharge conduit constructed in accordance with principles of the present disclosure can include a single feed inlet in other embodiments. For example, in embodiments, the discharge conduit can include a slurry distributor with a single feed inlet, an entry segment, and a shaped duct in fluid communication with a distribution conduit having a distribution outlet.

In embodiments, a slurry dispensing system constructed in accordance with principles of the present disclosure can be used to help provide a wide cross machine distribution of aqueous calcined gypsum slurry to facilitate the spreading of high viscous/lower WSR gypsum slurries on a web of cover sheet material moving over a forming table. The gypsum slurry dispensing system can be used to help control air-slurry phase separation, as well.

In embodiments, the slurry distributor 110 can comprise a part of, or act as, a discharge conduit of a conventional gypsum slurry mixer (e.g., a pin mixer) as is known in the art. In embodiments, the discharge conduit can include the slurry distributor 110 and components of a conventional discharge conduit. A slurry dispensing system constructed in accordance with principles of the present disclosure can advantageously be configured as a retrofit in an existing wallboard manufacturing system. For example, in embodiments, the pulser assembly 150 and the slurry distributor 110 can be used to replace a conventional single or multiple-branch boot used in conventional discharge conduits and used with components referred to as a "gate" and a "canister" as known in the art. In embodiments, the pulser assembly 150 and the slurry distributor 110 can be retrofitted to an existing slurry discharge conduit arrangement, such as that shown in U.S. Pat. Nos. 6,494,609; 6,874,930; 7,007,914; and 7,296,919, for example, as a replacement for the distal dispensing spout or boot. However, in some embodiments, the slurry distributor may, alternatively, be attached to one or more boot outlet(s).

The illustrated embodiment of the slurry distributor 110 is made from a flexible material, such as PVC or urethane, for example. The illustrated slurry distributor 110 is similar in construction and functionality to the slurry distributor 1420 shown and described in U.S. Patent Application No. 2013/0308411. In other embodiments, any suitable slurry distributor can be used, such as any of those shown and described in U.S. Patent Application Nos. 2012/0168527; 2012/0170403; 2013/0098268; 2013/0099027; 2013/0099418; 2013/0100759; 2013/0216717; 2013/0233880; and 2013/0308411, which are incorporated by reference herein.

In other embodiments, a slurry dispensing system constructed according to principles of the present disclosure can include a discharge conduit having a different configuration. For example, in embodiments, a slurry dispensing system can include a pulser assembly constructed following principles of the present disclosure and a conventional discharge conduit as known to those skilled in the art with a discharge boot at its terminal end. In embodiments, a discharge conduit having a multi-leg boot can be used.

Referring to FIG. 1, the illustrated slurry distributor 110 includes a bifurcated feed conduit 222 and a distribution conduit 228. The bifurcated feed conduit 222 of the slurry distributor 110 includes a first and a second feed portion 201, 202. The first and second feed portions 201, 202 are substantially similar to each other. Accordingly, it should be understood that the description of one feed portion is equally applicable to the other feed portion. In embodiments, the slurry distributor can include a single feed portion. In still further embodiments, the slurry distributor can include more than two feed portions.

Figure 5:
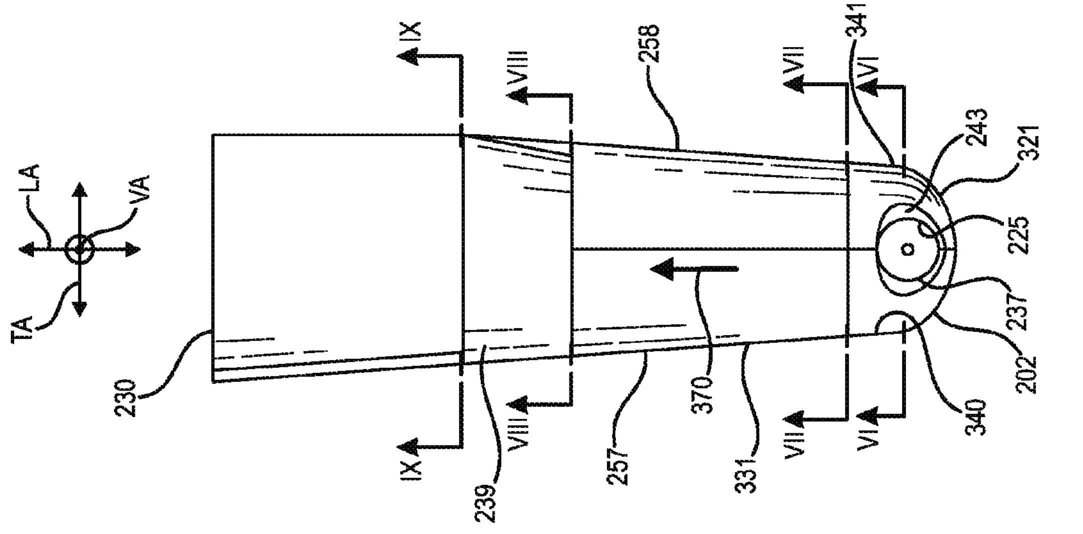
FIG. 5 is a top plan view of a half portion of a slurry distributor of the slurry dispensing system of FIG. 1.

Referring to FIG. 5, the feed portion 202 has an entry segment 237 with a feed inlet 225 and a feed entry outlet 311 (see FIG. 1) in fluid communication with the feed inlet 225, a shaped duct 243 having a bulb portion 321 in fluid communication with the feed entry outlet 311 of the entry segment 237 (see FIG. 1) and a transition segment 331 in fluid communication with the bulb portion 321.

Figure 6:
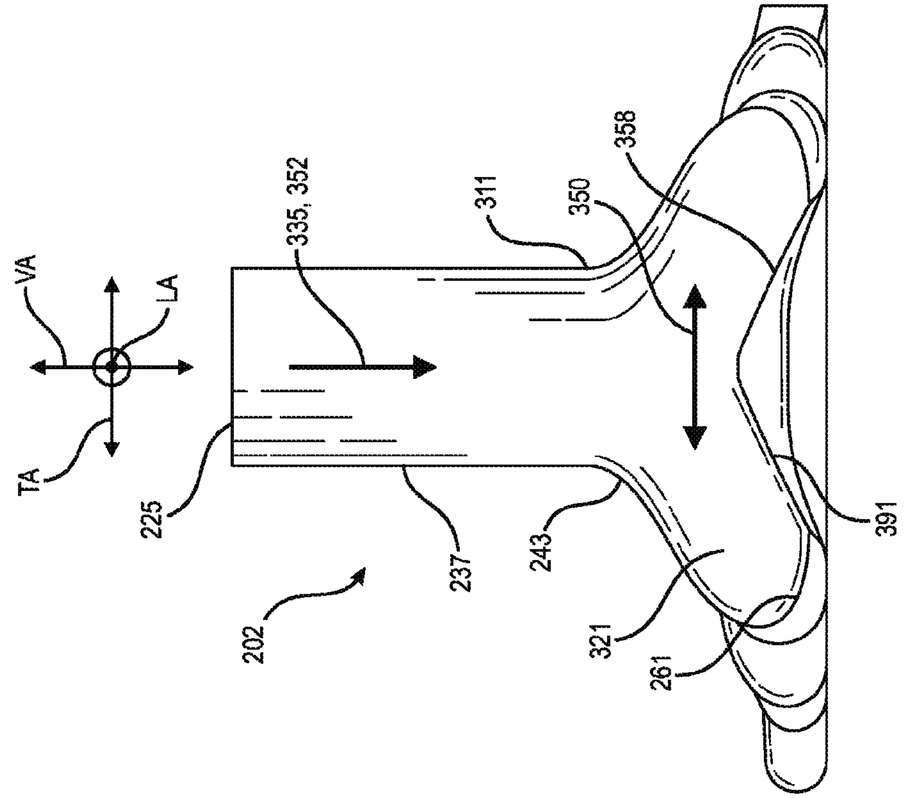
FIG. 6 is a cross-sectional view of the slurry distributor taken along line VI-VI in FIG. 5.

Referring to FIG. 6, the entry segment 237 is generally cylindrical and extends along a first feed flow axis 335. The first feed flow axis 335 of the illustrated entry segment 237 extends generally along the vertical axis VA. In other embodiments, the first feed flow axis 335 can have a different orientation with respect to the plane defined by the longitudinal axis LA and the transverse axis TA. For example, in other embodiments, the first feed flow axis 335 can be disposed at a feed pitch angle, measured as the degree of rotation relative to the transverse axis TA, that is non-perpendicular to the plane defined by the longitudinal axis LA and the transverse axis TA.

Figure 10:
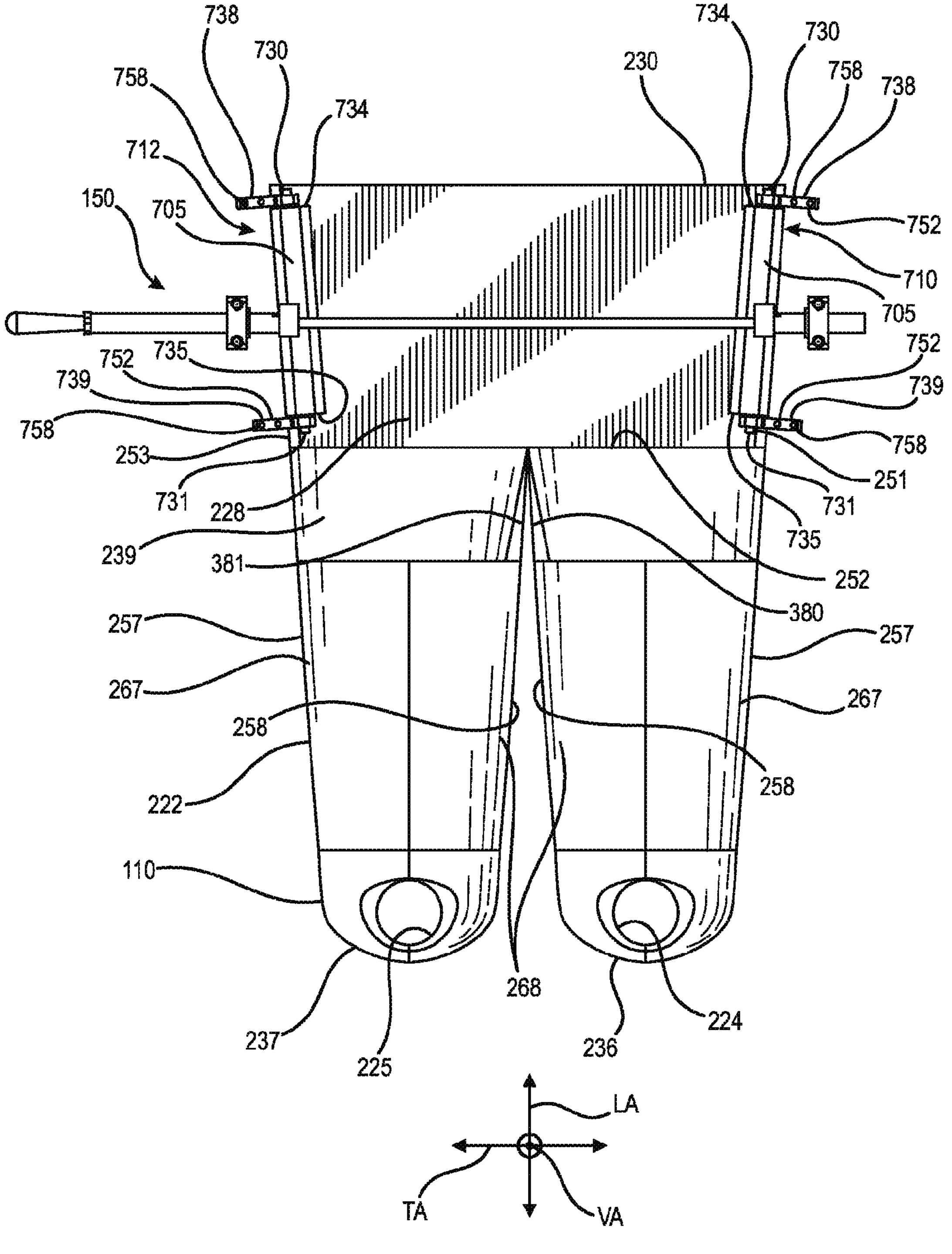
FIG. 10 is a top plan view of the slurry distributor and a pulser assembly of the slurry dispensing system of FIG. 1.

Referring to FIG. 10, the first and second feed inlets 224, 225 and the first and second entry segments 236, 237 can be disposed at a respective feed angle, measured as the degree of rotation relative to the vertical axis VA, in a range up to about 135° with respect to the longitudinal axis LA. The illustrated first and second feed inlets 224, 225 and the first and second entry segments 236, 237 are disposed at a respective feed angle substantially aligned with the longitudinal axis LA.

Referring to FIG. 5, the shaped duct 243 includes a pair of lateral sidewalls 340, 341 and the bulb portion 321. The shaped duct 243 is in fluid communication with the feed entry outlet 311 of the entry segment 237. The bulb portion 321 is configured to reduce the average velocity of a flow of slurry moving from the entry segment 237 through the bulb portion 321 to the transition segment 331. In embodiments, the bulb portion 321 is configured to reduce the average velocity of a flow of slurry moving from the entry segment 237 through the bulb portion 321 to the transition segment 331 by at least twenty percent.

Referring to FIG. 6, the bulb portion 321 can have an area of expansion 350 with a cross-sectional flow area that is greater than a cross-sectional flow area of an adjacent area upstream from the area of expansion relative to a flow direction 352 from the feed inlet 225 toward the distribution outlet of the distribution conduit 228. In embodiments, the bulb portion 321 has a region with a cross-sectional area in a plane perpendicular to the first flow axis 335 that is larger than the cross-sectional area of the feed entry outlet 311.

The shaped duct 243 has a convex interior surface 358 in confronting relationship with the feed entry outlet 311 of the entry segment 237. The bulb portion 321 has a generally radial guide channel 261 disposed adjacent the convex interior surface 358. The guide channel 261 is configured to promote radial flow in a plane substantially perpendicular to the first feed flow axis 335. The convex interior surface 358 is configured to define a central restriction in the flow path which also helps increase the average velocity of the slurry in the radial guide channel 261.

In the illustrated embodiment, the first feed flow axis 335 is substantially perpendicular to the longitudinal axis LA. In the illustrated embodiment, the first feed flow axis 335 is substantially parallel to the vertical axis VA, which is perpendicular to the longitudinal axis LA and the transverse axis TA.

Referring to FIG. 5, the transition segment 331 is in fluid communication with the bulb portion 321. The illustrated transition segment 331 extends along the longitudinal axis LA. The transition segment 331 is configured such that its width, measured along the transverse axis TA, increases in the direction of flow from the bulb portion 321 to a discharge outlet 230 of the distribution conduit 230. The transition segment 331 extends along a second feed flow axis 370, which is in non-parallel relationship with the first feed flow axis 335.

In embodiments, the second feed flow axis 370 is disposed at a respective feed angle in a range up to about 135° with respect to the longitudinal axis LA. In the illustrated embodiment, the second feed flow axis 370 is substantially parallel to the longitudinal axis LA.

Referring to FIG. 10, the feed conduit 222 includes a bifurcated connector segment 239 including first and second guide surfaces 380, 381. In embodiments, the first and second guide surfaces 380, 381 can be respectively adapted to redirect first and second flows of slurry entering the feed conduit 222 through the first and second inlets by a change in direction angle in a range up to about 135° to an outlet flow direction.

Figure 18:
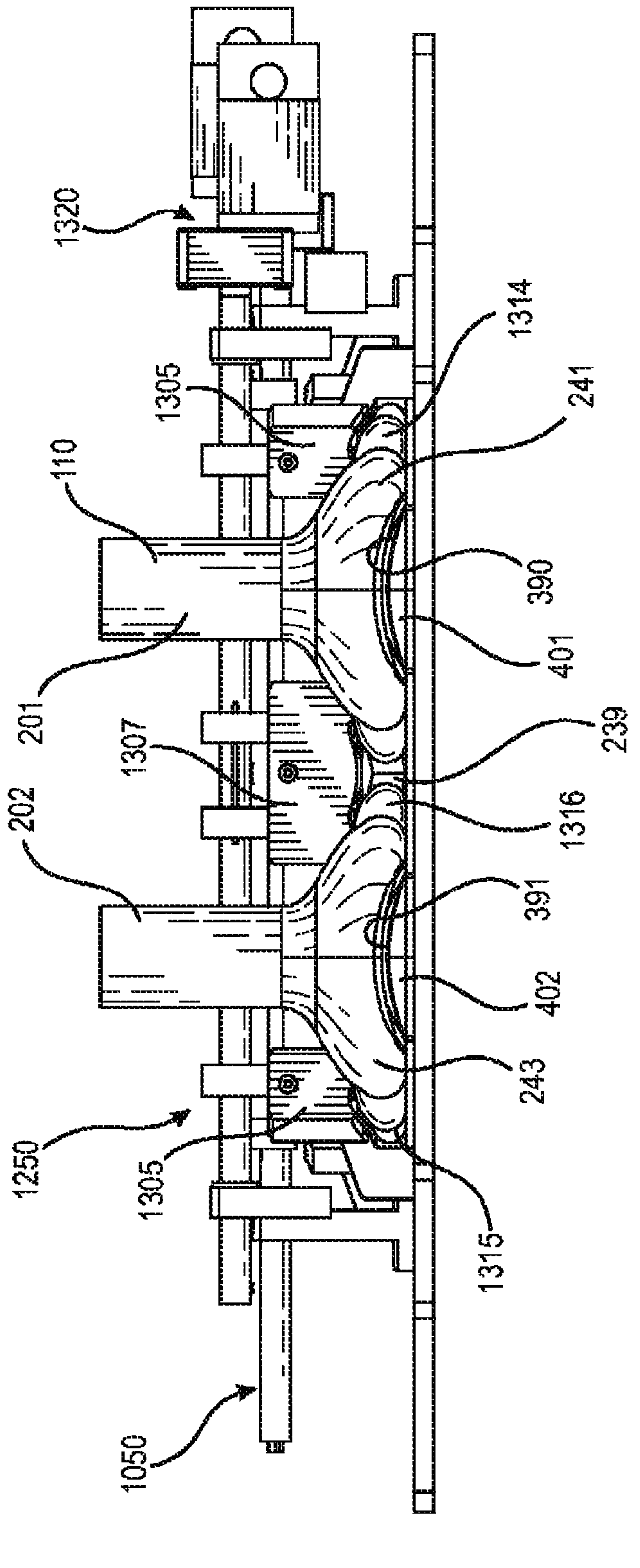
FIG. 18 is a rear elevational view of the slurry dispensing system of FIG. 15.

Referring to FIGS. 6 and 18, each of the shaped ducts 241, 243 has a concave exterior surface 390, 391 substantially complementary to the shape of the convex interior surface thereof and in underlying relationship therewith. Each concave exterior surface 390, 391 defines a recess. A support insert 401, 402 is disposed within each recess of the slurry distributor 110. The support inserts 401, 402 are disposed in underlying relationship to the respective convex interior surfaces of the shaped ducts 241, 243. The support inserts 401, 402 can be made from any suitable material which will help support the slurry distributor 110 and maintain a desired shape for the overlying interior convex surface. In the illustrated embodiment, the support inserts 401, 402 are substantially the same. In other embodiments, different support inserts can be used, and in still further embodiments the inserts are not used.

Referring to FIG. 10, the distribution conduit 228 extends generally along the longitudinal axis LA and includes an entry portion 252 and the discharge outlet 230 (see FIG. 2 also) in fluid communication with the entry portion 252. The entry portion 252 is in fluid communication with the first and second feed inlets 224, 225 of the feed conduit 222. The distribution conduit 228 has sidewalls 251, 253 which flare outwardly from the entry portion 252 to the discharge outlet 230 such that the width, measured along the transverse axis TA, of the distribution conduit 228 increases from the entry portion 252 to the discharge outlet 230. In other embodiments, however, the width of the distribution conduit 228 can decrease or remain substantially constant from the entry portion to the discharge outlet 230. In embodiments, the width-to-height ratio of the outlet opening 281 of the discharge outlet 230 of the discharge conduit is about four or more where the width of the outlet opening 281 is measured along the transverse axis TA and the height is measured along the vertical axis VA (see FIG. 2).

Referring to FIGS. 5-9, in some embodiments, the entry segment 237, the shaped duct 243, and/or the transition segment 331 can include one or more guide channels 267, 268 that are adapted to help distribute the flow of slurry toward the outer and/or the inner walls 257, 258 of the feed portion 202 of the feed conduit 222. The guide channels 267, 268 are adapted to increase the flow of slurry around the boundary wall layers of the slurry distributor 110.

Figure 7:
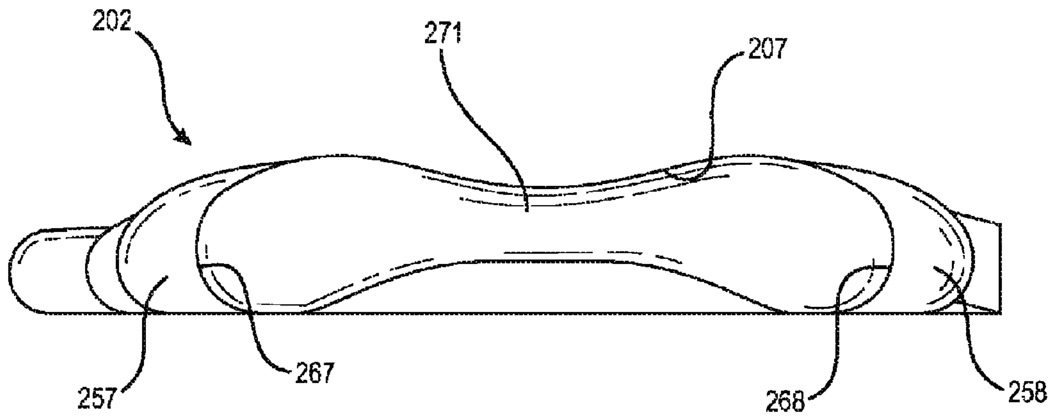
FIG. 7 is a cross-sectional view of the slurry distributor taken along line VII-VII in FIG. 5.
Figure 8:
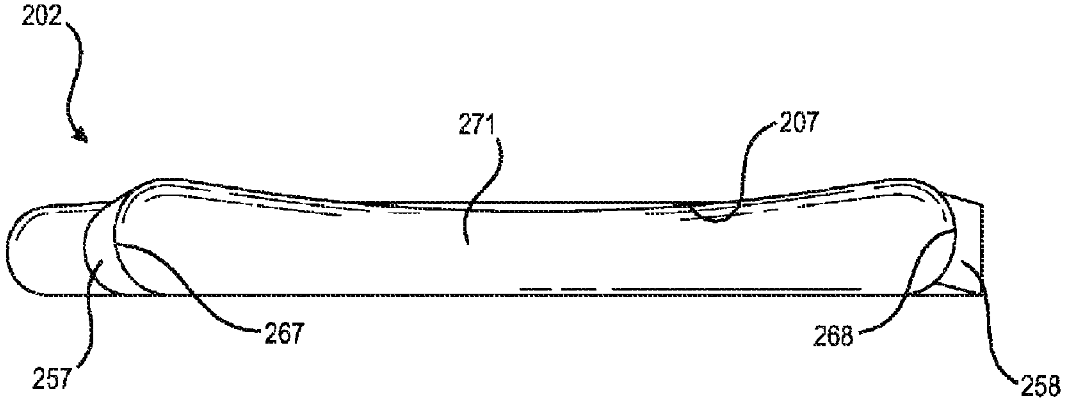
FIG. 8 is a cross-sectional view of the slurry distributor taken along line VIII-VIII in FIG. 5.
Figure 9:
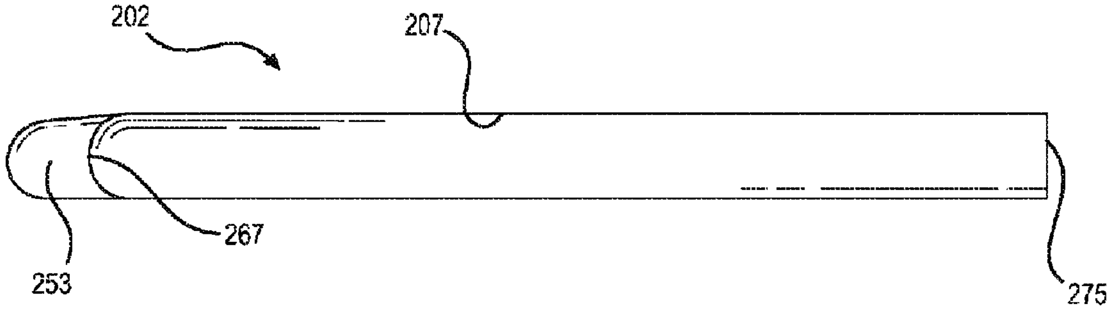
FIG. 9 is a cross-sectional view of the slurry distributor taken along line IX-IX in FIG. 5.

Referring to FIGS. 7 and 8, the guide channels 267, 268 can be configured to have a larger cross-sectional area than an adjacent portion 271 of the feed portion 202 which defines a restriction that promotes flow to the adjacent guide channel 267, 268 respectively disposed at the wall region of the slurry distributor 110.

Referring to FIG. 10, in the illustrated embodiment, each feed portion 201, 202 of the feed conduit 222 includes the outer guide channel 267 adjacent the outer wall 257 and the respective sidewall 251, 253 of the distribution conduit 228 and the inner guide channel 268 adjacent the inner wall 258 of the transition segment. The cross-sectional areas of the outer and inner guide channels 267, 268 can become progressively smaller moving in the outlet flow direction toward the discharge outlet 230. The outer guide channels 267 can extend substantially along the respective sidewalls 251, 253 of the distribution conduit 228 to the discharge outlet 230. Referring to FIGS. 5-9, the inner guide channel 268 is adjacent the inner wall 258 of the transition segment and terminates at the peak 275 of the bifurcated connector segment 239.

Providing guide channels adjacent wall regions can help direct or guide slurry flow to those regions, which can be areas in conventional systems where "dead spots" of low slurry flow are found. By encouraging slurry flow at the wall regions of the slurry distributor 110 through the provision of guide channels, slurry buildup inside the slurry distributor is discouraged and the cleanliness of the interior of the slurry distributor 110 can be enhanced. The frequency of slurry buildup breaking off into lumps which can tear the moving web of cover sheet material can also be decreased. In other embodiments, the relative sizes of the outer and inner guide channels 267, 268 can be varied to help adjust the slurry flow to improve flow stability and reduce the occurrence of air-liquid slurry phase separation.

Figure 2:
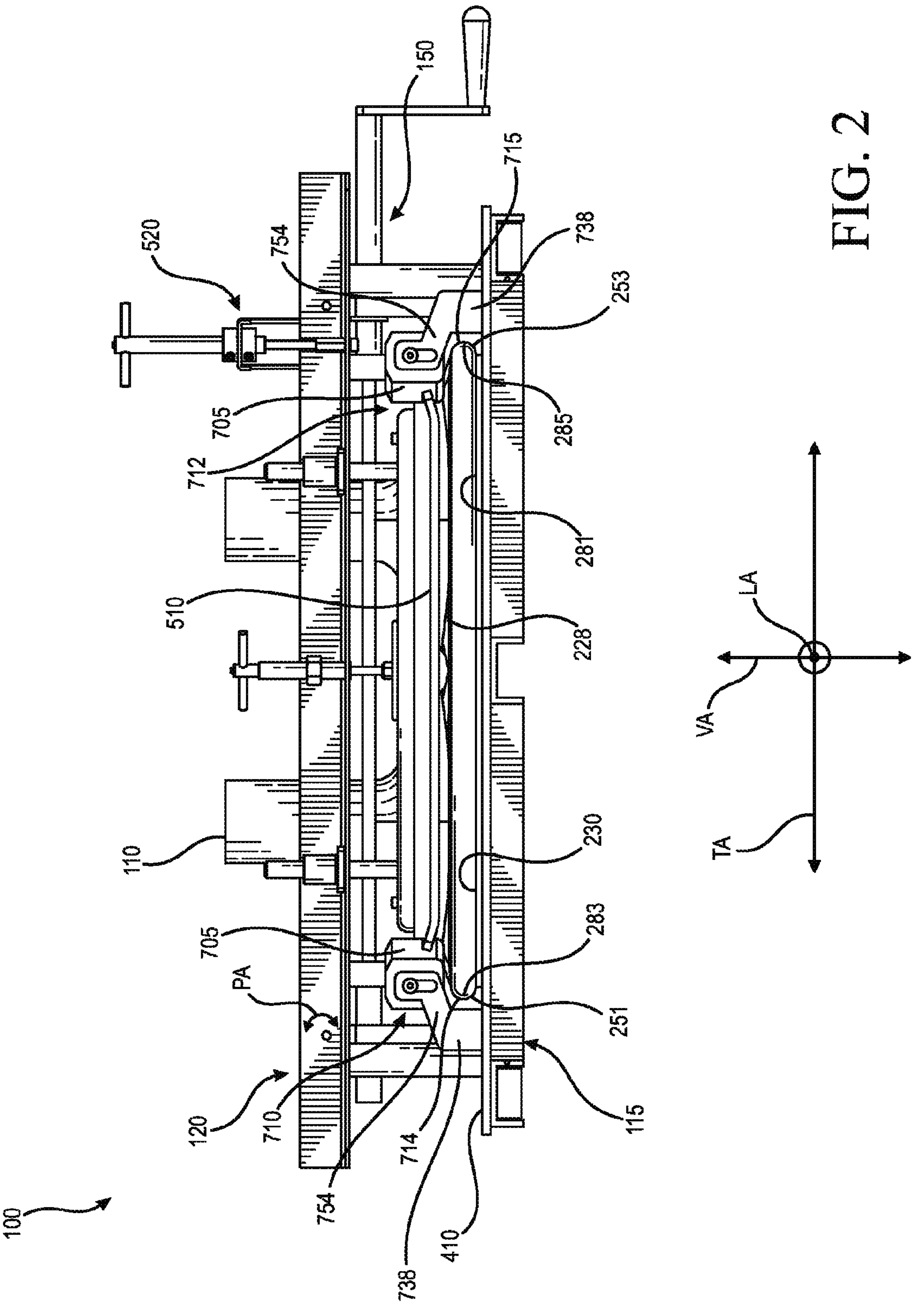
FIG. 2 is a front elevational view of the slurry dispensing system of FIG. 1.

Referring to FIG. 2, the illustrated discharge outlet 230 defines a generally rectangular opening 281 with semi-circular narrow ends 283, 285. The semi-circular ends 283, 285 of the opening 281 of the distribution outlet 230 can be the terminating end of the outer guide channels 267 disposed adjacent the side walls 251, 253 of the distribution conduit 228.

In embodiments, at least one of the feed conduit 222 and the distribution conduit 228 includes a flow stabilization region adapted to reduce an average feed velocity of a flow of slurry entering the feed inlets and moving to the discharge outlet 230 such that the flow of slurry discharges from the distribution outlet at an average discharge velocity that is at least twenty percent less than the average feed velocity, such as is shown and described in U.S. Patent Application Publication No. US2013/0308411, for example.

Any suitable technique for making a discharge conduit constructed in accordance with principles of the present disclosure can be used. For example, a multi-piece mold can be used to make a slurry distributor from a flexible material, such as PVC or urethane, such as is shown and described in U.S. Patent Application Publication No. US2013/0099418, for example. In some embodiments, the mold piece areas are about 150% or less than the area of the molded slurry distributor through which the mold piece is being pulled during removal, about 125% or less in other embodiments, about 115% or less in still other embodiments, and about 110% or less in yet other embodiments.

Figure 3:
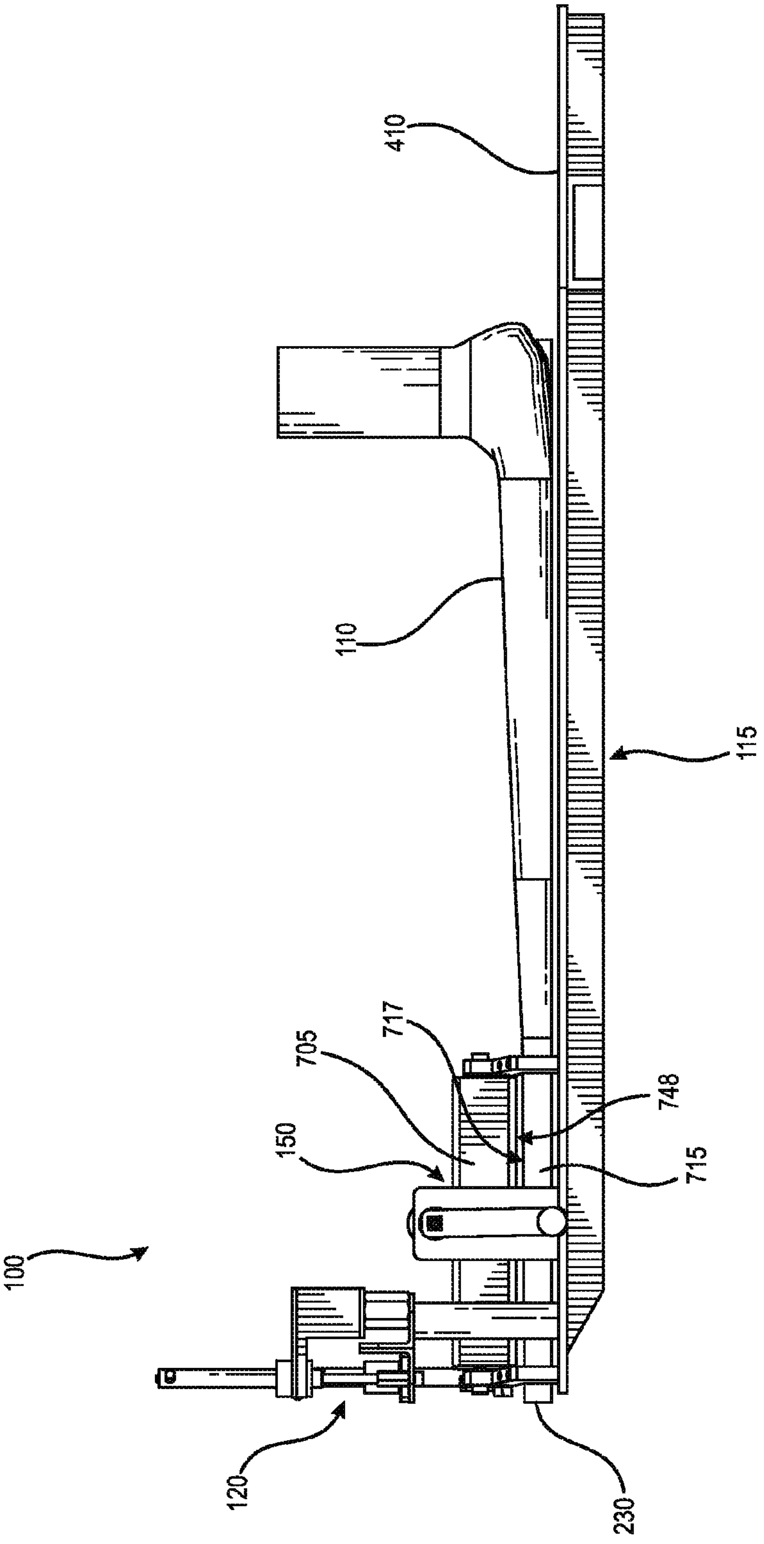
FIG. 3 is a left side elevational view of the slurry dispensing system of FIG. 1.

Referring to FIGS. 1-3, the distributor support assembly 115 can include a bottom support member or plate 410 and an upper support member (not shown). The bottom support member 410 can be constructed from a suitably rigid material, such as metal, for example. In use, the bottom support plate 410 can help support the slurry distributor 110 in place over a machine line including a conveyor assembly supporting and transporting a moving cover sheet. In embodiments, the bottom support plate 410 can be mounted to appropriate uprights placed on the sides of the bottom support plate.

Referring to FIG. 1, the bottom support member 410 defines a supporting surface 412 that can be configured to substantially conform to at least a portion of an exterior of at least one of the feed conduit 222 and the distribution conduit 228 to help limit the amount of relative movement between the slurry distributor 110 and the bottom support member 410. In some embodiments, the supporting surface 412 can also help maintain the interior geometry of the slurry distributor 110 through which a slurry will flow. In embodiments, additional anchoring structure can be provided to help secure the slurry distributor 110 to the bottom support member 410.

The upper support member can be disposed in spaced relationship to the bottom support member 410. The upper support member can be positioned above the slurry distributor 110 and adapted to be placed in supporting relationship with the slurry distributor 110 to help maintain the interior geometry 207 of the slurry distributor 110 in a desired configuration.

In embodiments, the distributor support assembly 115 can have a different configuration. For example, in embodiments, the distributor support assembly can be similar in construction and functionality to those shown and described in U.S. Patent Application Publication No. US 2013/0308411, which is incorporated herein by reference.

Referring to FIGS. 1-4, the profiling mechanism 120 is disposed at the discharge outlet 230 of the slurry distributor 110. Referring to FIG. 2, the profiling mechanism 120 includes a profiling member 510 in contacting relationship with the distribution conduit 228 and a mounting assembly 520 adapted to allow the profiling member 510 to have at least two degrees of freedom. In embodiments, the profiling member 510 is translatable along at least one axis and rotatable about at least one pivot axis.

In the illustrated embodiment, the profiling member 510 is movable along the vertical axis VA and rotatable about a pivot axis PA that is substantially parallel to the longitudinal axis LA. The profiling member 510 is movable over a range of travel such that the profiling member 510 is in a range of positions over which the profiling member 510 is in increasing compressive engagement with a portion of the distribution conduit 228 adjacent the discharge outlet 230 to vary the shape and/or size of the outlet opening.

In embodiments, the profiling member 510 is translatable over a range of vertical positions along the vertical axis VA and rotatable about the pivot axis PA which is substantially parallel to the longitudinal axis LA. The profiling member 510 is rotatable about the pivot axis PA over an arc length such that the profiling member 510 is in a range of positions over which the profiling member 510 is in variable compressive engagement with the portion of the distribution conduit 228 across the transverse axis TA such that the height, measured along the vertical axis VA in the illustrated embodiment, of the outlet opening 281 of the discharge outlet 230 varies along the transverse axis TA. The profiling mechanism 120 can include suitable structure adapted to fix the profiling member 510 in a selected one of the range of vertical positions and the radial positions over the arc length. The profiling mechanism 120 is similar in other respects to the profiling mechanism 1432 shown and described in U.S. Patent Application Publication No. US 2013/0233880, which is incorporated herein by reference. In embodiments, the profiling mechanism 120 can have a different configuration.

In embodiments, the slurry distributor has a flow geometry in its slurry passage which is configured to help distribute the flow of cementitious slurry internally in both the cross-machine and machine directions. The slurry velocity at or near the boundary wall of the distributor can be low, especially relative to slurry moving through an adjacent area. In use, build up with a setting compound such as gypsum slurry typically can be a problem along the sidewalls of a distributor. Over time, build up can occur which can undesirably alter the slurry discharge pattern or path. Lumps of the hardened build up can eventually break free and potentially cause problems downstream in the manufacturing process, as by causing a paper break when the lump passes through a forming station which will force the shutdown of the manufacturing line. A typical means of attempting to prevent this build up is to have a board line operator manually squeeze or "milk" the discharge conduit with their hands to break loose the build up that occurs along both sidewalls of the discharge conduit, such as in portions of the boot/distributor. This operator task can be particularly difficult to accomplish when using wide boots or distributors.

Referring to FIGS. 1-4, the pulser assembly 150 can be provided to help prevent the occurrence of slurry build up within a discharge conduit, which in the illustrated embodiment includes the slurry distributor 110 made from a resiliently flexible material, such as PVC or urethane, for example. The pulser assembly 150 can be adapted to help maintain the interior flow geometry of the flexible discharge conduit 110 and to periodically compress at least a portion of the discharge conduit 110 to help reduce slurry buildup therein.

Referring to FIG. 1, in embodiments, the pulser assembly 150 can be adapted to periodically compress a portion of the slurry distributor 110 such that an interior flow geometry 207 defined within the slurry distributor 110 is modified. In embodiments, the pulser assembly 150 can include a compression member 705 adapted to contactingly engage a portion of the discharge conduit 110 and a drive mechanism 720 adapted to selectively move the compression member 705 into compressing engagement with the discharge conduit 110. In embodiments, the drive mechanism 720 can be operated to periodically drive the compression member 705 into compressing engagement with the portion of the discharge conduit 110 to correspondingly pulse or flex the engaged portion of the discharge conduit 110. The pulsing movement of the flexible discharge conduit 110 can help prevent slurry buildup inside the discharge conduit 110.

The illustrated pulser assembly 150 includes a pair of compression member assemblies 710, 712 and the drive mechanism 720. Each compression member assembly 710, 712 has a compression member 705 adapted to contactingly engage a respective portion 714, 715 of the slurry distributor 110. Each compression member 705 extends along the longitudinal axis LA and is reciprocally movable along the vertical axis VA over a range of travel between a neutral position, in which the compression member 705 contactingly engages the respective sidewall portion 714, 715 of the discharge conduit 110, and a compressed position, in which the compression member 705 is in respective compressing engagement with the discharge conduit 110 such that a portion of the interior wall surface underlying the respective sidewall portion 714, 715 is flexed. The sidewall portions 714, 715 are more flexed when the respective compression member 705 is in the compressed position than when in the neutral position.

The drive mechanism 720 is adapted to selectively move each compression member 705 into compressing engagement with the slurry distributor 110. The illustrated drive mechanism 720 is adapted to reciprocally move each compression member 705 over the range of travel between the neutral position and the compressed position.

The illustrated compression member assemblies 710, 712 are substantially the same, but are mirror images of each other. Each compression member assembly 710, 712 is adapted to support the associated compression member 705 such that it is movable over a range of travel between a normal position and a range of compressing positions, including a maximum compressed position.

The components of the compression member assemblies 710, 712 can be constructed from any suitable material. In embodiments, the components of the compression member assemblies are made from aluminum and/or stainless steel. In embodiments, the compression members can be made from a suitable metal, such as aluminum, for example, and have a coating layer with a harder material, such as a hardened anodized aluminum coating, for example.

Referring to FIG. 10, each illustrated compression member assembly 710, 712 includes the compression member 705, a pair of mounting pins 730, 731 respectively connected to opposing ends 734, 735 of the compression member 705, and a pair of support brackets 738, 739 in spaced relationship to each other. In each compression member assembly 710, 712, the compression member 705 is disposed between the support brackets 738, 739. The compression members 705 can be disposed along the lateral sides 251, 253 of the slurry distributor 110 adjacent the discharge outlet 230.

In the illustrated embodiment, the compression members 705 are respectively in substantial overlying relationship with the sidewalls 251, 253 of the distribution conduit 228 of the slurry distributor 110 and the outer guide channels 267 of the slurry passageway. In the illustrated embodiment, the compression members 705 extend along the longitudinal axis LA substantially from the discharge outlet 230 to the entry portion 252 of the distribution conduit 228 of the slurry distributor 110. In other embodiments, a pulser assembly constructed in accordance with principles of the present disclosure can include a movable compression member disposed at another portion of the slurry distributor, such as, at another location which includes a boundary wall layer defining a portion of the slurry passageway through the distributor 110 or at any location where slurry build up is observed and/or sought to be inhibited.

Figure 11:
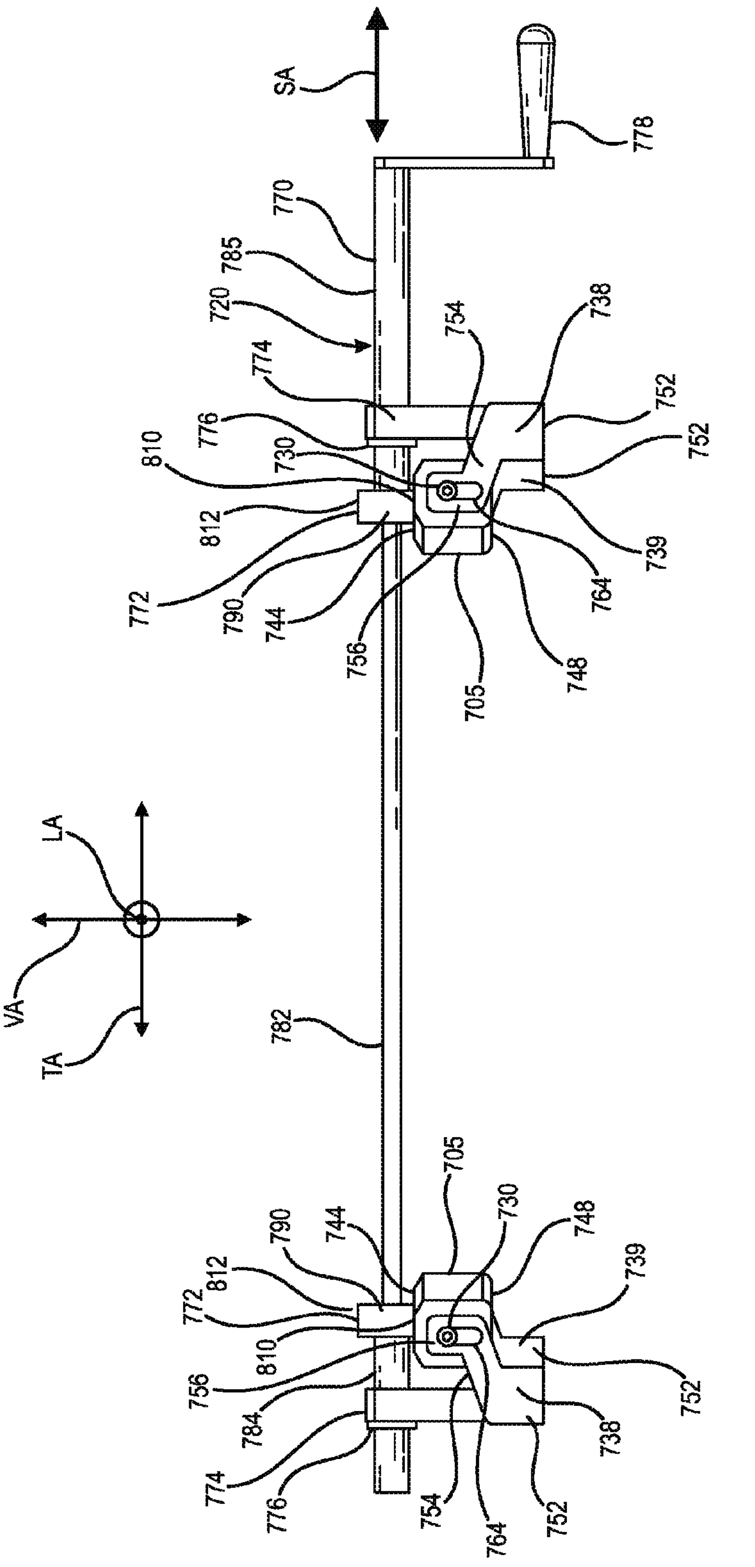
FIG. 11 is a front elevational view of the pulser assembly of the slurry dispensing system of FIG. 1.

Referring to FIG. 11, the illustrated compression members 705 are substantially similar to each other. Each compression member 705 is generally in the shape of a rectangular block and has a cam surface 744 in opposing relationship to a contacting surface 748. In embodiments, the cam surface 744 is configured to operably engage the drive mechanism 720 to transmit the movement of the drive mechanism 720 to the compression member 705. In embodiments, the contacting surface 748 is configured to engagingly contact a respective portion 714, 715 of the slurry distributor 110.

Figure 4:
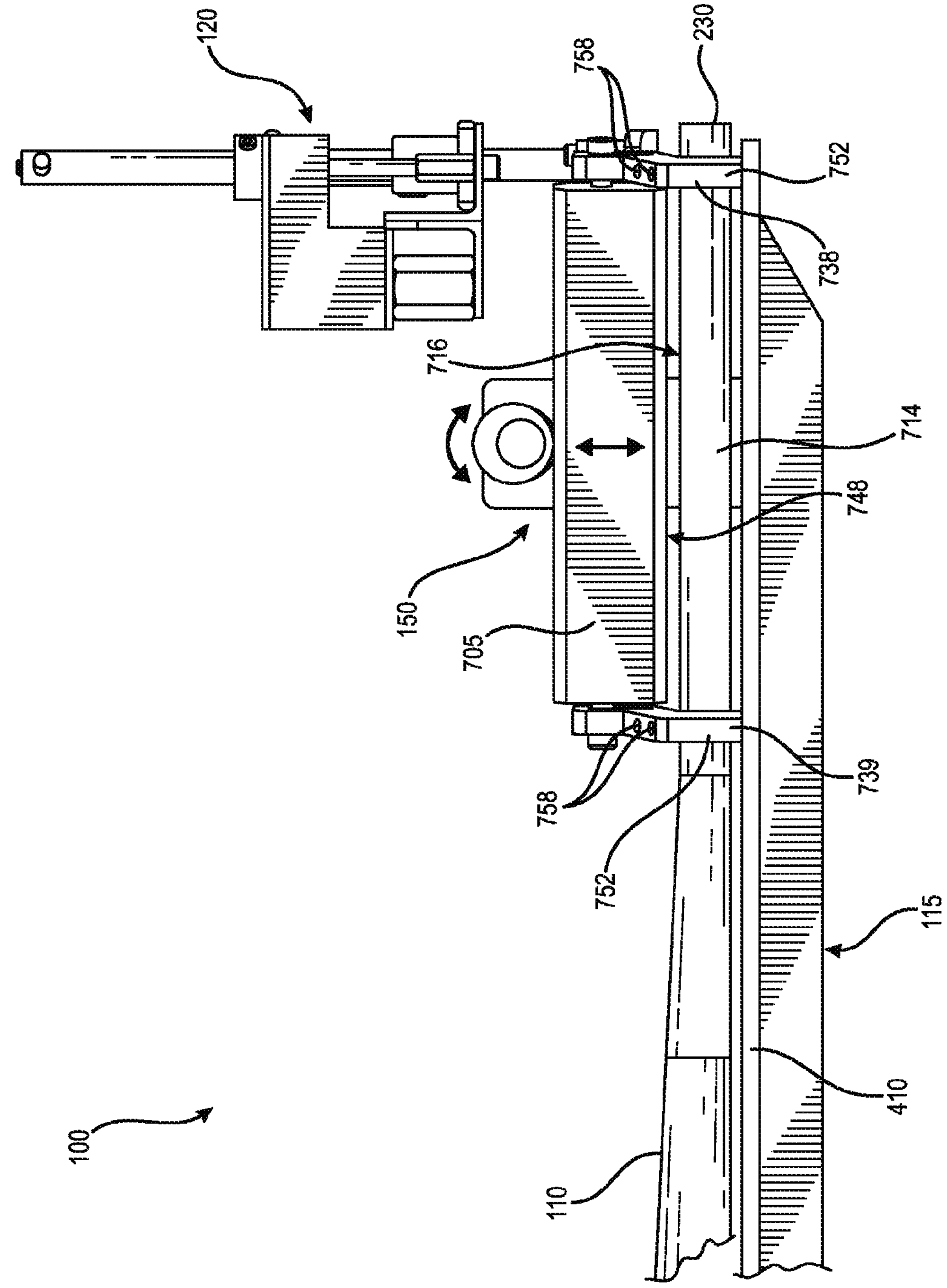
FIG. 4 is a fragmentary, right side elevational view of the slurry dispensing system of FIG. 1 with a mount removed for illustrative purposes.

Referring to FIGS. 3 and 4, in embodiments, each compression member 705 is adapted to contactingly support the slurry distributor 110 such that the contacting surface 748 of the compression member 705, when it is in the neutral position (as shown in FIGS. 3 and 4), is in retentive engagement with a respective exterior surface 716, 717 of sidewall portions 714, 715 of the slurry distributor 110 so that an underlying portion of the interior wall surface of the slurry distributor 110, which defines the slurry passage, substantially conforms to the shape of the topography of the exterior contacting surface 748 of the compression member 705 when cementitious slurry passes through the interior passage of the distributor 110 at or above a given pressure. The slurry distributor 110 can expand outwardly in response to the pressure of the slurry passing therethrough. When the compression member 705 moves to a compressing position, the compression member 705 deforms the contacted portion 714, 715 of the slurry distributor 110 to promote a pulsing effect within the interior passage of the slurry distributor 110 to help reduce slurry build up therein. In embodiments, each contacting surface 748 of the compression members 705 has a compression member topography which substantially corresponds with the discharge conduit sidewall topography of the exterior sidewall surface of the contacted portion 714, 715 of the discharge conduit 110. In embodiments, the shape and/or topography of the contacting surface 748 can vary.

Referring to FIGS. 1 and 11, the support brackets 738, 739 have substantially the same configuration but are mounted to the bottom support plate 410 with different orientations. Referring to FIG. 11, each support bracket 738, 739 includes a mounting end 752, an intermediate offset portion 754, and a compression member support end 756. Referring to FIG. 10, the mounting end 752 of each support bracket 738, 739 can define a plurality of mounting holes 758 therethrough which are each configured to accept a fastener therethrough for securing the support brackets 738, 739 to the bottom support plate 410, for example (see FIG. 4). The support brackets 738, 739 can be mounted to the bottom support plate 410 such that the compression member 705 which the brackets 738, 739 support is disposed at a selected portion 714 of the slurry distributor 110. Referring to FIG. 10, in the illustrated embodiment, one support bracket 738 is flared outwardly relative to the other support bracket 739 to match the outward flare of the distribution conduit 228 of the slurry distributor 110.

Referring to FIG. 2, the intermediate offset portion 754 of the support brackets 738, 739 can be configured to allow the compression members 705 to be supported by the support brackets 738, 739 such that the compression members 705 are in overlying relationship with respective portions 714, 715 of the slurry distributor 110. In the illustrated embodiments, the intermediate offset portions 754 of the support brackets 738, 739 of the first and second compression member assemblies 710, 712 are mirror images of each other such that the respective compression member assembly 710, 712 is positioned with the associated compression member 705 in overlying relationship with the sidewalls 251, 253 of the distribution conduit of the slurry distributor 110.

In embodiments, the mounting end 752 of each support bracket 738, 739 can be configured to help locate the discharge outlet 230 of the slurry distributor 110 at a desired location upon the bottom support plate 410. The mounting ends 752 can be configured to help limit the relative translation of the discharge outlet 230 of the slurry distributor with respect to the bottom support plate 410 along the transverse axis TA.

Referring to FIGS. 1 and 11, each compression member support end 756 of the support brackets 738, 739 defines a pin slot 764 which is configured to receive a respective mounting pin 730, 731 therethrough to movably retain the compression member 705. In embodiments, the compression member 705 is movable over a range of travel along the vertical axis VA between a normal position (as shown in FIG. 11) and a range of compressing positions in which the compression member is in increasing compressing relationship with a portion of the slurry distributor up through a maximum compressed position. The length of the pin slot 764 can be configured such that the drive mechanism 720 can selectively move the compression members 705 over the full range of travel between the normal position and the maximum compressed position.

Referring to FIG. 11, the drive mechanism 720 can include a shaft 770, a pair of eccentric cams 772 mounted to the shaft 770, and a pair of mounts 774 having a respective bushing 776 disposed therein. The shaft 770 extends through the bushings 776 of the mounts 774, 775 and is journaled for rotation about its longitudinal axis SA. In embodiments, the drive mechanism 720 can include a suitable actuator to rotate the shaft 770 about its longitudinal axis SA. For example, in embodiments, the drive mechanism 720 includes at least one of a crank handle 778 and a motor coupled to an end of the shaft 770 to selectively rotate the shaft 770 and the eccentric cams 772 about the longitudinal shaft axis SA. In the illustrated embodiment of FIG. 11, a crank handle 778 is affixed to one end of the shaft 770 to allow an operator to operate the drive mechanism 720 from one side of the slurry distributor 110.

The components of the drive mechanism 720 can be constructed from any suitable material. In embodiments, the bushings 776 can be made from brass and the other components of the drive mechanism 720 can be made from aluminum and/or stainless steel.

Figure 12:
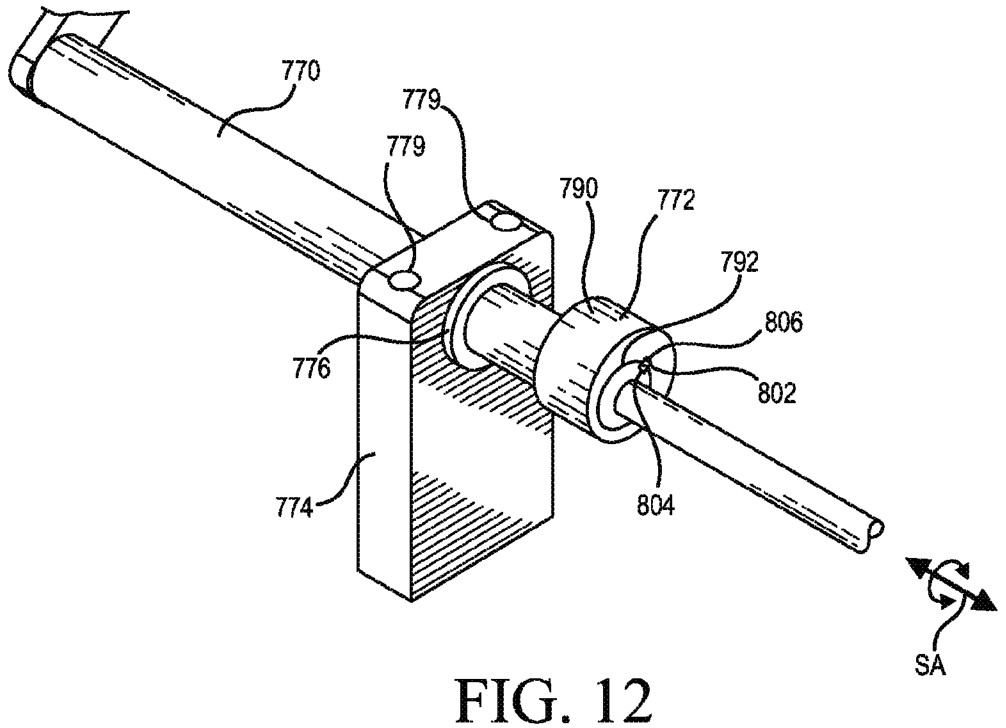
FIG. 12 is an enlarged, detail view, in perspective, of a shaft journaled for rotation within a mount of the pulser assembly of FIG. 11.

Referring to FIG. 12, the mounts 774 are substantially identical to each other. Each mount 774 can define at least one mounting hole 779 therein which is configured to receive a fastener therethrough. Fasteners can be used to secure the mounts 774 to the bottom support plate 410, as shown in FIG. 1, for example. Each mount 774 has a respective bushing 776 disposed therein. The bushings 776 can be configured to accept the shaft 770 therethrough such that the bushings 776 support the shaft 770 while permitting it to rotate about its longitudinal axis SA.

The shaft 770 is generally in the form of a cylindrical rod. The illustrated shaft 770 includes an intermediate portion 782 with a reduced diameter relative to the ends 784, 785 thereof.

The eccentric cams 772 are substantially identical to each other and have the same configuration. The eccentric cams 772 are operably arranged with a respective compression member 705 such that the eccentric cams 772 are in respective overlying relationship with the compression members 705. The eccentric cams 772 can be mounted in spaced relationship to each other along the shaft 770 such that they are aligned with a confronting cam surface 744 of the compression members 705, respectively.

A revolution of the shaft 770 causes the eccentric cams 772 to reciprocally move the compression members 705, respectively, over the range of travel such that the compression members 705 return to the position in which they were at the beginning of the revolution of the shaft 770. For example, the eccentric cams 772 are in respective, engaging contact with the compression members 705 such that a revolution of the eccentric cams 772 reciprocally moves the compression members 705 over a complete cycle of the range of travel from the neutral position, in which the compression members 705 contactingly engage respective sidewall portions 714, 715 of the discharge conduit 110, to the compressed position, in which the compression members 705 are in compressing engagement with the discharge conduit 110 such that the portions of the interior wall surface underlying the sidewall portions 714, 715 are flexed, and back to the neutral position. The sidewall portions 714, 715 are more flexed when the compression members 705 are in the compressed position than when in the neutral position.

Figure 13:
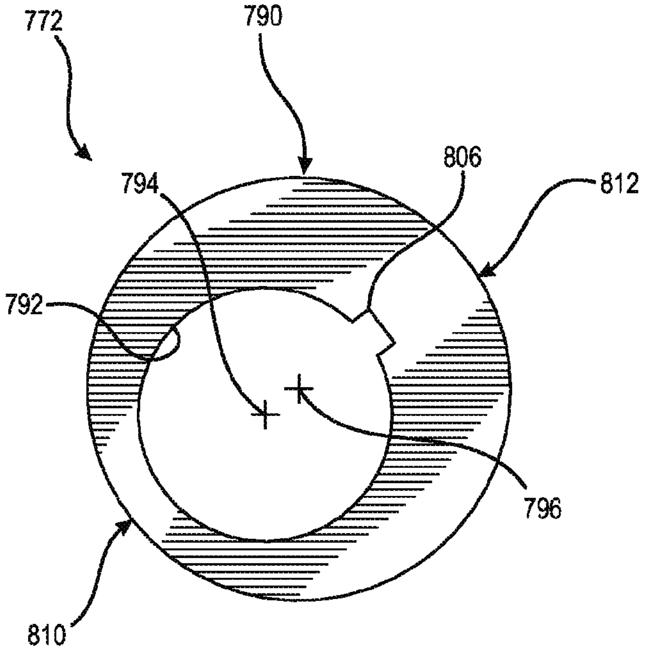
FIG. 13 is a side elevational view of an embodiment of an eccentric cam suitable for use in embodiments of a pulser assembly constructed in accordance with principles of the present disclosure.

Referring to FIGS. 12 and 13, the eccentric cam 772 has a substantially cylindrical outer cam surface 790. The eccentric cam 772 defines a shaft hole 792 which is configured to receive the shaft 770 therethrough. A center 794 of the shaft hole 792 is in offset relationship to a geometric center 796 of the cam 772.

Referring to FIG. 12, each eccentric cam 772 can be rotatively coupled to the shaft 770 by any suitable technique. In the illustrated embodiment, a spline 802 is disposed within a pair of aligned grooves 804, 806 in the shaft 770 and the eccentric cam 772. The interaction of the spline 802 and the surfaces defining the grooves 804, 806 prevent the eccentric cam 772 from rotating relative to the shaft 770. The spline-and-groove configuration can also be used to help align the eccentric cams 772 with respect to each other.

Referring to FIG. 13, a rest end 810 of the eccentric cam 772 is defined by the portion of the outer cam surface 790 that is radially closest to the center 794 of the shaft hole 792. A compression end 812 of the eccentric cam 772 is defined by the portion of the outer cam surface 790 that is radially farthest from the center 794 of the shaft hole 792.

The difference between: (1) the distance between the center 794 of the shaft hole 792 and the compression end 812 and (2) the distance between the center 794 of the shaft hole 792 and the rest end 810 can define the range of travel over which the compression member 705 can move as the eccentric cam 772 rotates with the turning shaft 770. In other embodiments, the size and/or configuration of the cam 772 can be changed to vary the range of travel over which the compression member 705 is movable. In embodiments, the length of the range of travel between the neutral position and the maximum compressed position of the compression member can be varied by varying the size of the eccentric cam with which it is associated and/or the relative location of the shaft to which the eccentric cam is mounted relative to the discharge conduit.

Referring to FIG. 11, as the eccentric cams 772 and the shaft 770 rotate about the shaft's longitudinal axis SA, the outer cam surfaces 790 of the eccentric cams 772 respectively engage the confronting cam surface 744 of the compression member 705 with which it is associated. The rotating eccentric cams 772 produce a smooth rise and fall motion in the followers (the compression members 705) wherein the compression member 705 is in the normal position when the rest end 810 of the eccentric cam 772 is in engaging contact with the compression member 705 (as shown in FIG. 11) and the compression member 705 is in the maximum compressed position when the compression end 812 of the eccentric cam 772 is in engaging contact with the compression member 705.

In the illustrated embodiment the eccentric cams 772 are substantially aligned with each other such that the compression ends 812 of the eccentric cams 772 are substantially circumferentially aligned with each other about the shaft 770. Accordingly, rotating the shaft 770 causes the compression members 705 to reciprocally move substantially in unison in substantial synchronization over the range of travel.

In other embodiments, the relative location of the compression ends 812 of the eccentric cams 772 can be varied. For example, in embodiments, the compression ends 812 of the eccentric cams 772 can be out of phase with respect to each other, such as about 180 degrees apart from each other about the circumference of the shaft 770 such that the compression blocks 705 move in substantially alternating fashion.

In use, an operator can rotate the crank handle 778 (either clockwise or counter-clockwise) to rotate the eccentric cams 772 located above the compression blocks 705 that are disposed along the lateral edges 251, 253 of the slurry distributor 110. As the handle 778 is moved in either a clockwise or counter clockwise direction, the eccentric cams 772 alternately push down on the compression blocks 705 to move the compression blocks 705 to the maximum compressed position and then allow the compression blocks 705 to return to the normal position in response to the pressure of the slurry moving through the slurry distributor 110, thereby creating a pulsing effect in those areas. The pulsing action can act as a mechanical means of temporarily altering the distributor boundary wall "envelope" that defines the slurry passageway therethrough so that build up can be prevented or cleared if it already has begun to occur. The rotation frequency and/or period of the eccentric cams 772 can be varied depending on the nature of the slurry and its tendency to build-up.

In other embodiments, the configuration of the cams 772 can be altered to produce a different movement pattern in response to rotating the shaft 770. For example, in other embodiments, pear-shaped cams can be used such that the compression members 705 have a dwell time in the normal position and/or the maximum compressed position. In still other embodiments, other suitable drive mechanisms can be used, such as electrically-operated solenoid systems and pneumatically or hydraulically-driven cylinder systems, for example.

Figure 14:
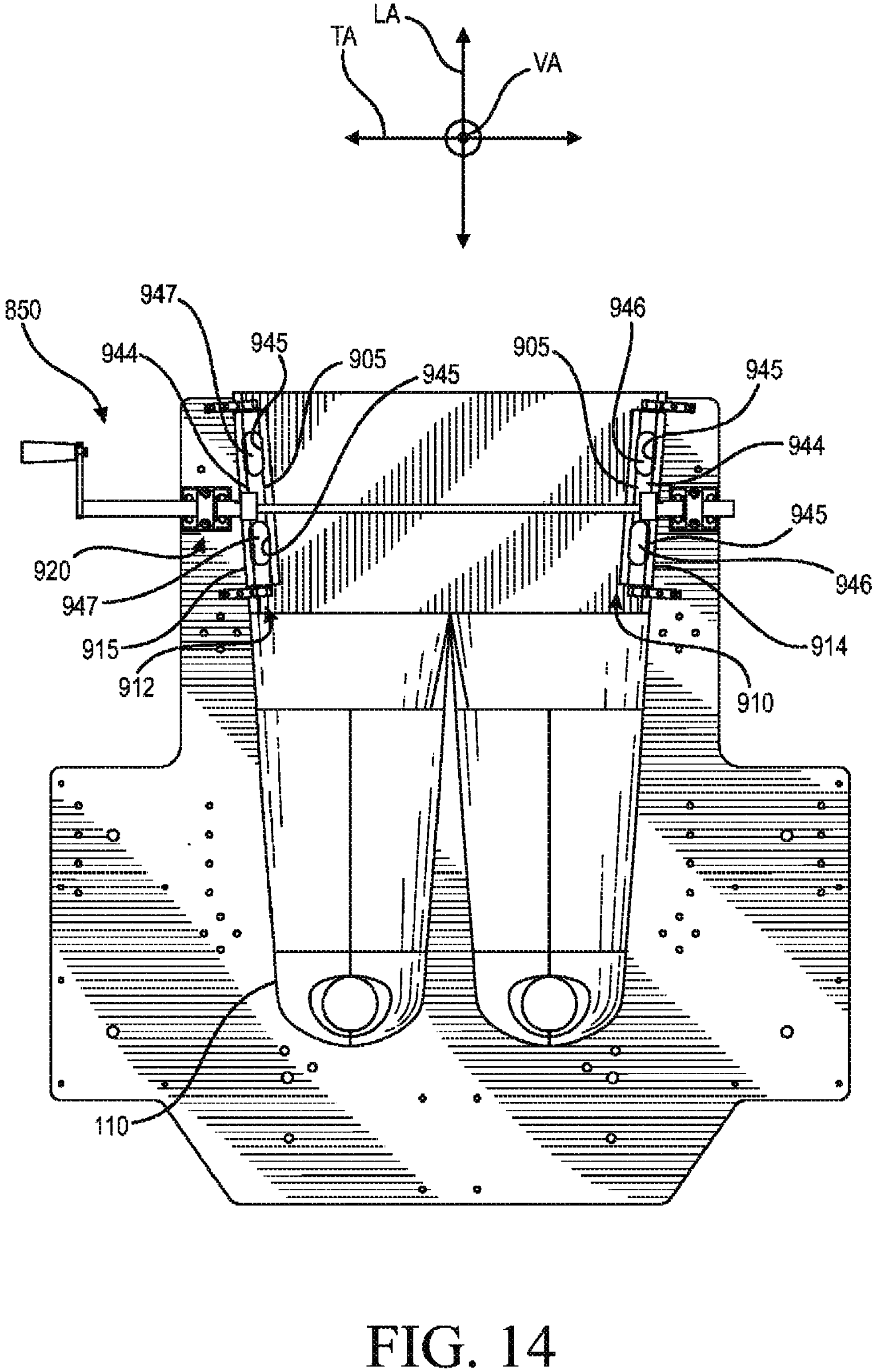
FIG. 14 is a top plan view of another embodiment of a slurry dispensing system constructed in accordance with principles of the present disclosure having slotted compression members.
Figure 15:
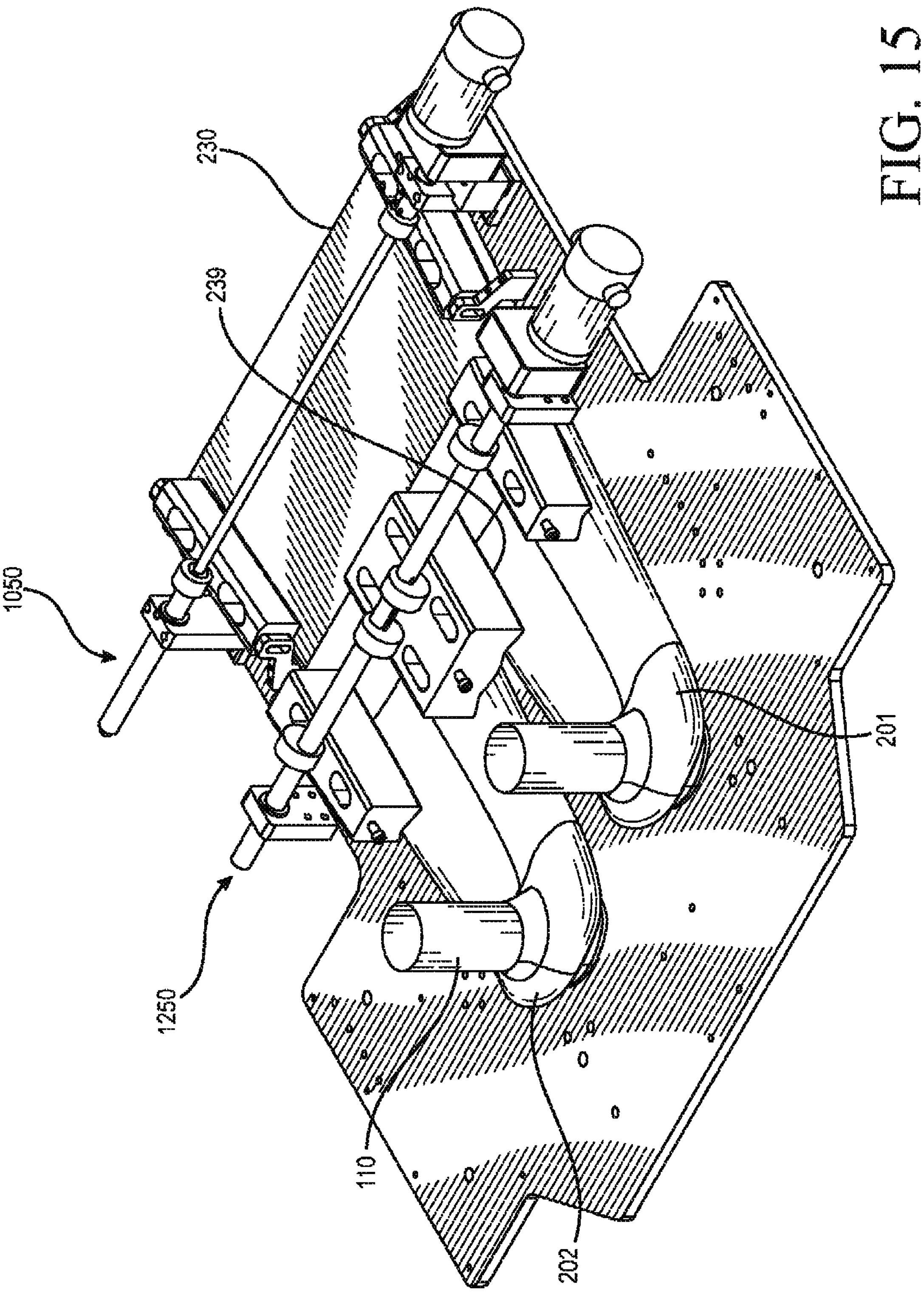
FIG. 15 is a perspective view of another embodiment of a slurry dispensing system constructed in accordance with principles of the present disclosure having a pair of pulser assemblies.

Referring to FIG. 14, another embodiment of a pulser assembly 850 constructed in accordance with principles of the present disclosure is shown arranged with a discharge conduit in the form of the slurry distributor 110. The pulser assembly 850 can be adapted to periodically compress a portion of the slurry distributor 110 such that an interior flow geometry defined within the slurry distributor 110 is modified. In embodiments, the pulser assembly 850 includes a pair of compression members 905 adapted to contactingly engage respective portions 914, 915 of the slurry distributor 110 and a drive mechanism 920 adapted to selectively move the compression members 905 into compressing engagement with the slurry distributor 110. In embodiments, the drive mechanism 920 can be operated to periodically drive the compression members 905 into compressing engagement with the respective portions 914, 915 of the slurry distributor 110 to correspondingly pulse or flex the engaged portions 914, 915 of the slurry distributor 110. The pulsing movement of the flexible slurry distributor 110 can help prevent slurry buildup inside the slurry distributor 110.

The illustrated compression member assemblies 910, 912 are substantially the same, but are mirror images of each other. Each compression member assembly 910, 912 is adapted to support the associated compression member 905 such that it is movable over a range of travel along the vertical axis VA between a normal position and a range of compressing positions, including a maximum compressed position.

Each compression member 905 includes a pair of longitudinally extending slots 945 extending between the cam surface 944 and the contacting surface 948 thereof. The slots 945 are each configured such that a segment 946, 947 of the respective sidewall portion 914, 915 of the discharge conduit 110 in contacting engagement with the respective compression member 905 is accessible from the cam surface 944 of the compression member 905. The slots 945 can be configured to provide an operator with access to the respective portion 914, 915 of the discharge conduit 110 in underlying relationship to the compression member 905. Each illustrated slot 945 is generally in the form of an elongated oval. In other embodiments, the shape of the slots 945 can be different.

The drive mechanism 920 includes T-shaped mounts 974, but is similar in other respects to the drive mechanism 720 of the pulser assembly 150 of FIGS. 1-4 described above. The pulser assembly 850 of FIG. 14 can be similar in other respects to the pulser assembly 150 of FIGS. 1-4 as described above.

Referring to FIGS. 15-18, other embodiments of a pulser assembly 1050, 1250 constructed in accordance with principles of the present disclosure are shown arranged with a discharge conduit in the form of the slurry distributor 110. In this arrangement a pair of pulser assemblies 1050, 1250 are arranged in spaced relationship to each other along the longitudinal axis LA of the discharge conduit 110. The first pulser assembly 1050 is disposed adjacent the discharge outlet 230 of the slurry distributor 110. The second pulser assembly 1250 is disposed in overlying relationship with portions of the first and second feed portions 201, 202 and the bifurcated connector segment 239 of the slurry distributor 110.

Figure 16:
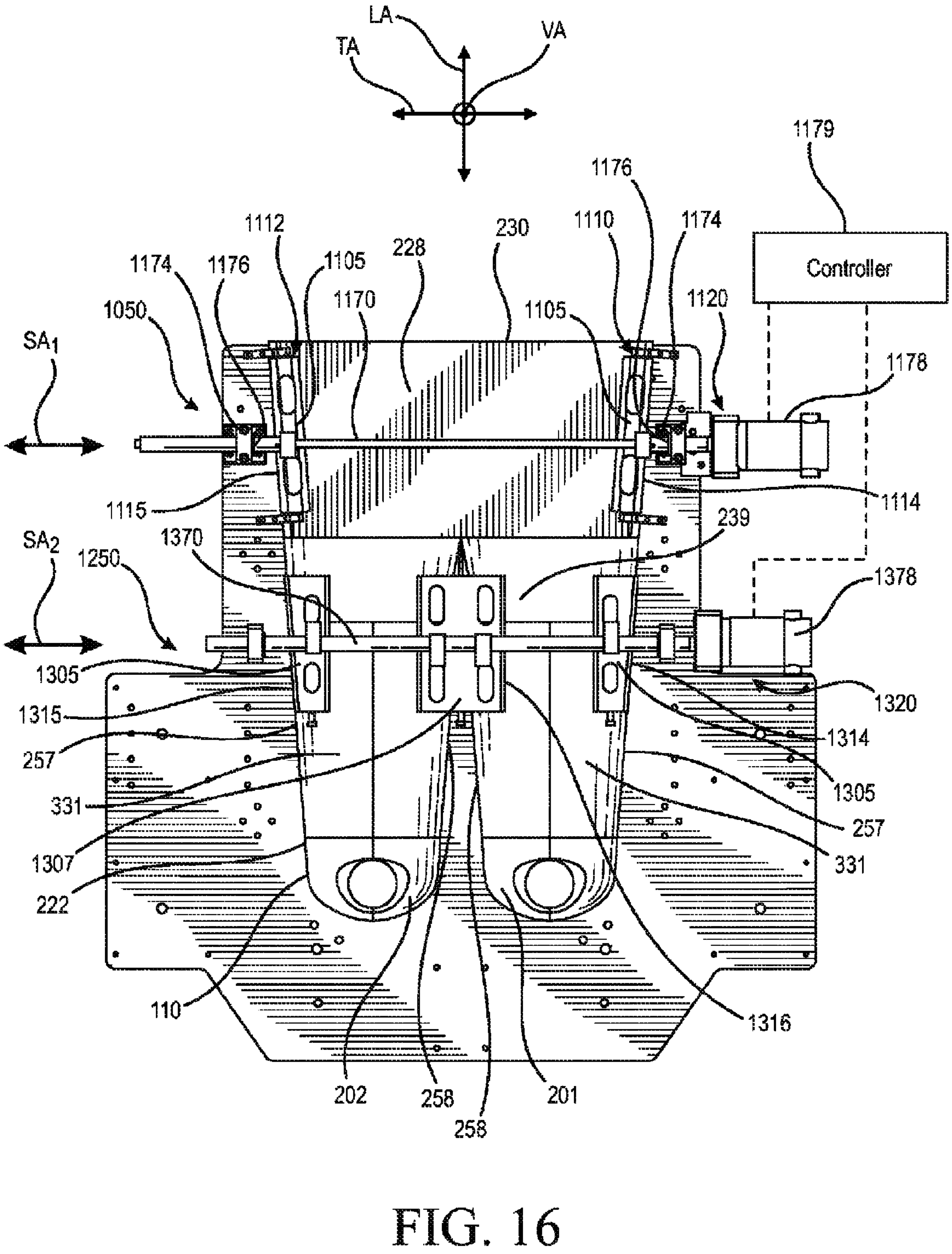
FIG. 16 is a top plan view of the slurry dispensing system of FIG. 15.
Figure 17:
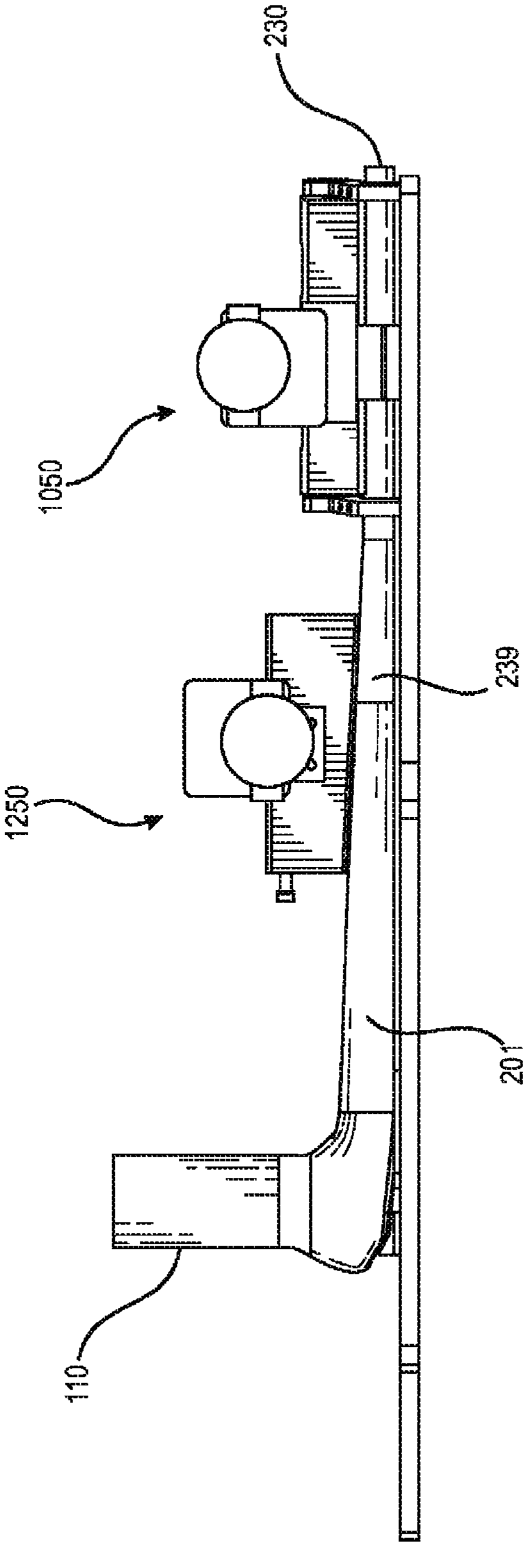
FIG. 17 is a right side elevational view of the slurry dispensing system of FIG. 15.

Referring to FIG. 16, the first pulser assembly 1050 includes a pair of compression members 1105 adapted to contactingly engage respective portions 1114, 1115 of the distribution conduit 228 of the slurry distributor 110 and a drive mechanism 1120 adapted to selectively move the compression members 1105 into compressing engagement with the slurry distributor 110. In embodiments, the drive mechanism 1120 can be operated to periodically drive the compression members 1105 into compressing engagement with the respective portions 1114, 1115 of the slurry distributor 110 to correspondingly pulse or flex the engaged portions 1114, 1115 of the slurry distributor 110. The pulsing movement of the flexible slurry distributor 110 can help prevent slurry buildup inside the slurry distributor 110.

The illustrated compression member assemblies 1110, 1112 are substantially the same, but are mirror images of each other. Each compression member assembly 1110, 1112 is adapted to support the associated compression member 1105 such that it is movable over a range of travel along the vertical axis VA between a normal position and a range of compressing positions, including a maximum compressed position. The compression member assemblies 1110, 1112 of FIGS. 15-18 are similar in construction to the compression member assemblies 910, 912 of FIG. 14.

The drive mechanism 1120 can include a shaft 1170, a pair of eccentric cams 1172 mounted to the shaft 1170, a pair of T-shaped mounts 1174 having a respective bushing 1176 disposed therein, and a motor 1178 operably arranged with the shaft to selectively rotate the shaft 1170 about its longitudinal shaft axis $SA_1$. The shaft 770 extends through the bushings 1176 of the mounts 1174 and is journaled for rotation about its longitudinal axis $SA_1$. A controller 1179 can be in electrical arrangement with the motor 1178 and adapted to selectively control the operation of the motor 1178 to rotate the shaft 1170 in one or more rotational patterns. The first pulser assembly 1050 of FIGS. 15-18 can be similar in other respects to the pulser assembly 150 of FIGS. 1-4 as described above.

Referring to FIG. 16, the second pulser assembly 1250 includes a pair of side compression members 1305 and an intermediate compression member 1307 each adapted to contactingly engage respective portions 1314, 1315, 1316 of the bifurcated feed conduit 222 of the slurry distributor 110 and a drive mechanism 1320 adapted to selectively move the side compression members 1305 and the intermediate compression member 1307 into compressing engagement with the slurry distributor 110.

The side compression members 1305 are disposed in respective, overlying, contacting relationship with portions of the first and second feed portions 201, 202 of the slurry distributor 110. The side compression members 1305 are disposed in overlying relationship with the outer walls 257 of the first and second feed portions 201, 202 of the feed conduit 222, respectively.

The intermediate compression member 1307 is disposed between the pair of side compression members 1305 and is in overlying, contacting relationship with the connector segment 239 of the slurry distributor 110. The intermediate compression member 1307 is disposed in overlying relationship with the inner walls 258 of the transition segments 331 of the first and second feed portions 201, 202 of the feed conduit 222.

In embodiments, the side compression members 1305 and the intermediate compression member 1307 can be supported by a pair of support brackets (not shown) which extend from side to side of the slurry distributor. Each compression member 1305, 1307 can be equipped with a pair of mounting pins as described above which extend through corresponding pin slots in the support brackets to allow the compression members 1305, 1307 to be movable over a range of travel along the vertical axis VA between a normal position and a range of compressing positions, including a maximum compressed position.

In embodiments, the drive mechanism 1320 can be operated to periodically drive the side compression members 1305 in an alternating fashion with respect to the intermediate compression member 1307 such that the side compression members 1305 are moved into compressing engagement with the respective portions 1314, 1315 of the slurry distributor 110 to correspondingly pulse or flex the engaged portions 1314, 1315 of the slurry distributor 110 in an alternating fashion relative to the compressing action of the intermediate compression member 1307 upon the intermediate portion 1316 of the slurry distributor (see FIG. 18 also). The alternating pulsing movement of the flexible slurry distributor 110 can help prevent slurry buildup inside the slurry distributor 110. In other embodiments, the side compression members 1305 and the intermediate compression member 1307 can reciprocally move together in substantial synchronization or with a different, out of phase relationship.

Figure 19:
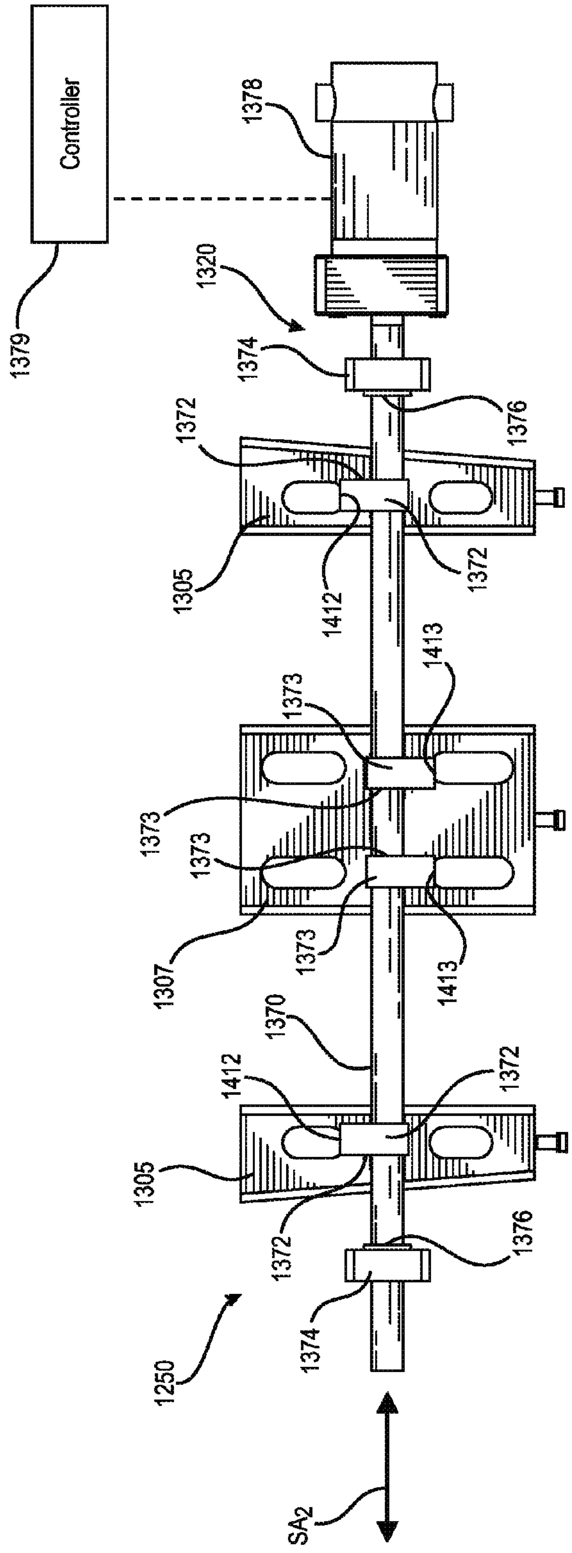
FIG. 19 is a top plan view of an intermediate pulser assembly of the slurry dispensing system of FIG. 15.

Referring to FIG. 19, the drive mechanism 1320 of the second pulser assembly 1250 can include a shaft 1370, a pair of side eccentric cams 1372 and a pair of intermediate eccentric cams 1373 mounted to the shaft 1370, a pair of mounts 1374 having a respective bushing 1376 disposed therein, and a motor 1378 operably arranged with the shaft 1370 to selectively rotate the shaft 1370 about its longitudinal shaft axis $SA_2$.

The shaft 1370 extends through the bushings 1376 of the mounts 1374 and is journaled for rotation about its longitudinal axis $SA_2$. The controller 1179 can be in electrical arrangement with the motor 1378 and adapted to selectively control the operation of the motor 1378 to rotate the shaft 1370 in one or more rotational patterns.

The drive mechanism 1320 of the second pulser assembly 1250 is adapted to reciprocally move the side compression members 1305 and the intermediate compression member

1307 such that the side compression members 1305 move in substantial synchronization with respect to each other and out of phase with respect to the intermediate compression member 1307. The side eccentric cams 1372 are in spaced relationship to each other and are in respective operable arrangement with the side compression members 1305. The intermediate eccentric cams 1373 are both in operable arrangement with the intermediate compression member 1307. Compression ends 1412 of the side eccentric cams 1372 can be circumferentially aligned with each other and in opposing relationship to the compression ends 1413 of the intermediate eccentric cams 1373 about the circumference of the shaft 1370 such that the side compression members 1305 move in substantially alternating fashion with respect to the intermediate compression member 1307 as the shaft 1370 rotates about it longitudinal axis $SA_2$.

Figure 20:
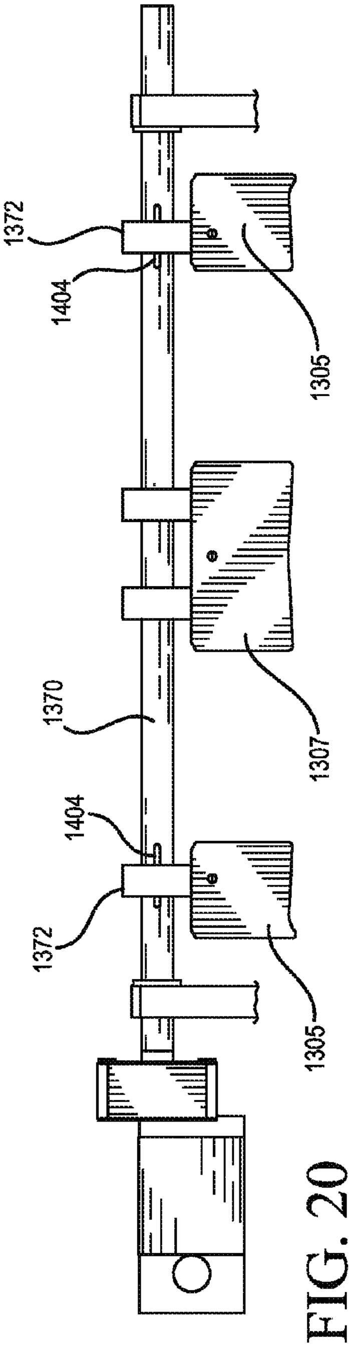
FIG. 20 is a front elevational view of the pulser assembly of FIG. 19.
Figure 21:
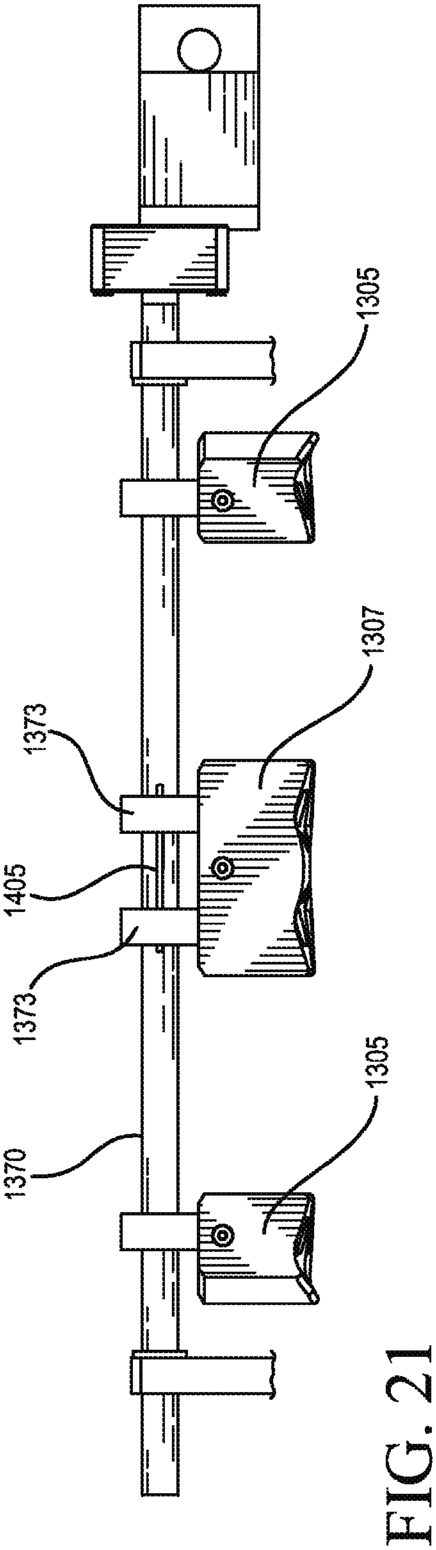
FIG. 21 is a rear elevational view of the pulser assembly of FIG. 19.

Referring to FIG. 20, the shaft 1370 can have a pair of side grooves 1404 defined therein for use in a groove-and-spline connection technique for rotatively coupling the side eccentric cams 1372 to the shaft 1370. Referring to FIG. 21, the shaft 1370 can have an elongated intermediate groove 1405 defined therein for use in a groove-and-spline connection technique for rotatively coupling the intermediate eccentric cams 1373 to the shaft 1370. In the illustrated embodiment, the pair of side grooves 1404 is substantially aligned with each other about the circumference of the shaft 1370. The intermediate groove 1405 can be disposed in offset circumferential relationship with the pair of side grooves 1404 such that the intermediate eccentric cams 1373 rotate about the shaft 1370 out of phase with respect to the side eccentric cams 1372, thereby reciprocally moving the side compression members 1305 in substantial synchronization with respect to each other and the intermediate compression member out of phase with respect to the pair of side compression members 1305. The second pulser assembly 1250 of FIGS. 15-18 can be similar in other respects to the pulser assembly 150 of FIGS. 1-4 as described above.

Referring to FIG. 16, in embodiments, the controller 1179 can be adapted to control the rotation of the shaft 1170 of the first pulser assembly 1050 such that the compression members 1105 are periodically reciprocally moved from the normal position to the maximum compressed position according to a predetermined frequency to periodically compress the underlying portions 1114, 1115 of the slurry distributor 110. In embodiments, the controller 1179 can be adapted to selectively operate the motor 1178 to rotate the shaft 1170 through a cycle in response to a pulse command signal. The controller 1179 can be operated to automatically and/or selectively rotate the shaft 1170 to periodically apply a compressive force through the compression members 1105 upon the engaged portions 1114, 115 of the slurry distributor 110.

In embodiments, the controller 1179 can be adapted to control the rotation of the shaft 1370 of the second pulser assembly 1250 such that the side compression members 1305 are periodically reciprocally moved from the normal position to the maximum compressed position according to a predetermined frequency to periodically compress the underlying portions 1314, 1315 of the slurry distributor 110 and the intermediate compression member 1307 is periodically reciprocally moved from the normal position to the maximum compressed position in alternate relationship to the movement of the side compression members 1305. In embodiments, the controller 1179 can be adapted to selectively operate the motor 1378 to rotate the shaft 1370 through a cycle in response to a pulse command signal. The controller 1179 can be operated to automatically and/or selectively rotate the shaft 1370 to periodically apply a compressive force through the side compression members 1305 and the intermediate compression member 1307 upon the engaged portions 1314, 1315, 1316 of the slurry distributor 110.

In embodiments, the drive mechanisms 1120, 1320 of the first and second pulser assemblies 1050, 1250, respectively, are adapted to reciprocally move the side compression members 1305 of the second pulser assembly 1250 in substantial alternating fashion with respect to the compression members 1105 of the first pulser assembly 1050. In embodiments, the controller 1179 can be adapted to sequentially operate the first and the second pulser assemblies 1050, 1250 such that the side compression members 1305 of the second pulser assembly 1250 are reciprocally moved from the normal position to the maximum compressed position out of phase with the movement of the compression members 1105 of the first pulser assembly 1050. For example, in embodiments, the controller 1179 can be adapted to sequentially operate the first and the second pulser assemblies 1050, 1250 such that the side compression members 1305 of the second pulser assembly 1250 are in the maximum compressed position when the compression members 1105 of the first pulser assembly are in the normal position and vice versa.

The first and second pulser assemblies 1050, 1250 can also provide support for the slurry distributor 110 to help maintain the internal geometry of the slurry distributor 110 and help prevent unwanted distortion, which can help maintain proper velocity and flow characteristics when slurry flows through the slurry distributor 110. The flexible slurry distributor 110 can tend to deform outwardly in response to the pressure of the cementitious slurry passing through the slurry passage defined within the slurry distributor 110. The first and second pulser assemblies 1050, 1250 can be configured to substantially limit the outward deformation of the slurry distributor 110 when the compression members 1105, 1305, 1307 are in the neutral position to maintain a desired flow geometry within the slurry passage of the slurry distributor 110.

Figure 22:
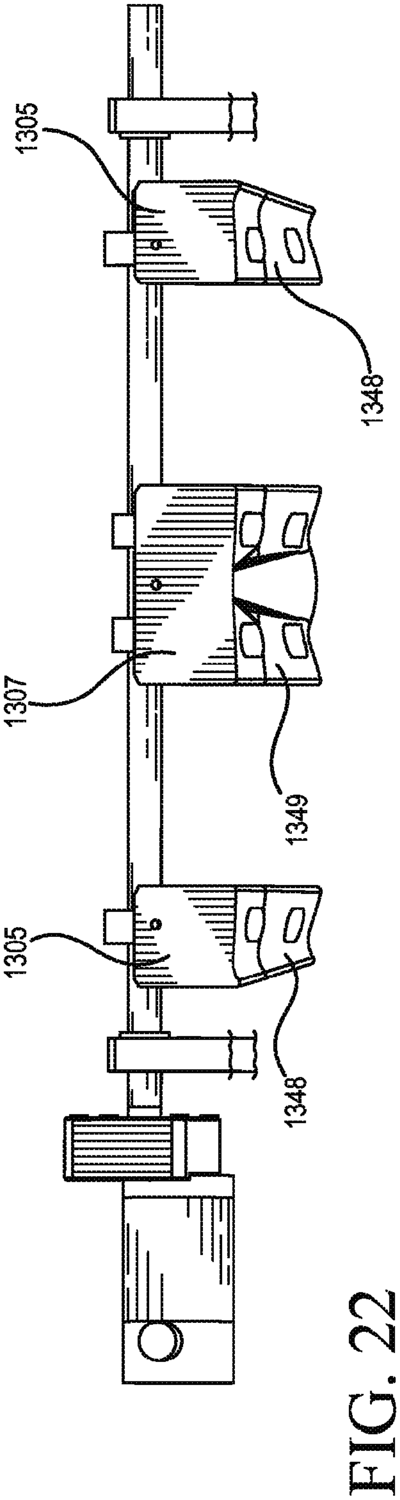
FIG. 22 is a perspective view, from the front and below, of the pulser assembly of FIG. 19.

Referring to FIG. 22, in embodiments, the exterior contacting surfaces 1348, 1349 of the side compression members 1305 and the intermediate compression member 1307 are configured to have at least a portion with a flow topography. The compression members 1305, 1307 are adapted to contactingly support the slurry distributor such that the flow topography of the compression members 1305, 1307, when in the neutral position, is in retentive engagement with a surface of the slurry distributor so that an underlying portion of the interior passage of the slurry distributor substantially conforms to the flow topography of the respective exterior contacting surface 1348, 1349 when cementitious slurry passes through the interior passage at or above a given pressure. When the compression members 1305, 1307 alternatingly move to a compressing position, the compression members 1305, 1307 deform the contacted portion of the slurry distributor to promote a pulsing effect within the interior passage of the slurry distributor to help reduce slurry build up therein.

The second pulser assembly 1250 can help maintain the interior geometry of the slurry distributor in a desired configuration. The contacting surfaces 1348, 1349 of the side compression members 1305 and the intermediate compression member 1307 can be configured such that they substantially conform to the exterior of the underlying portion of slurry distributor 110 to help limit the amount of movement the slurry distributor 110 can undergo with respect to the bottom base plate 410 and/or to help define the interior geometry of the slurry distributor 110 through which a slurry will flow.

Figure 23:
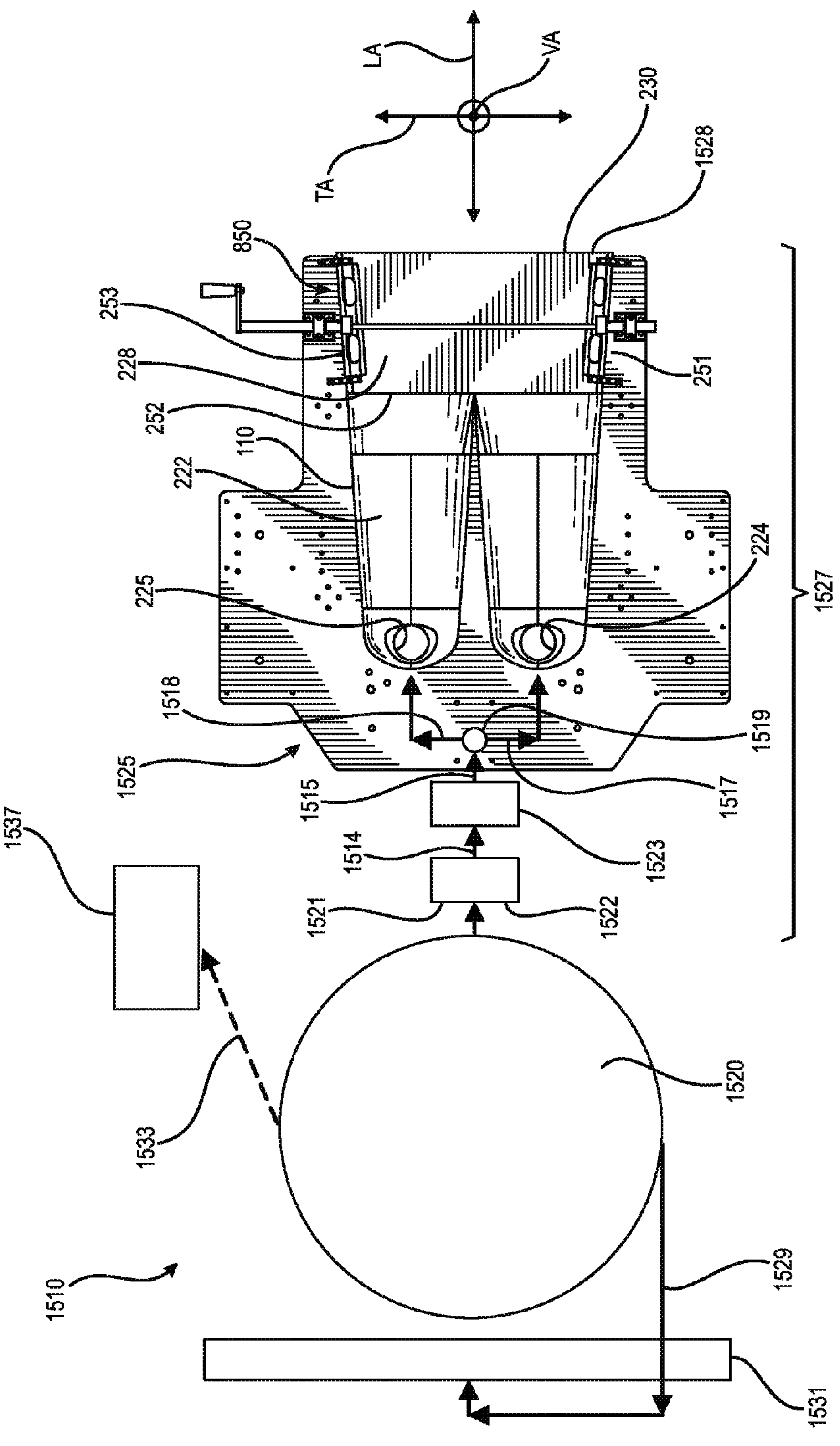
FIG. 23 is a schematic plan diagram of an embodiment of a cementitious slurry mixing and dispensing system, including an embodiment of a slurry dispensing system, constructed in accordance with principles of the present disclosure.
Figure 24:
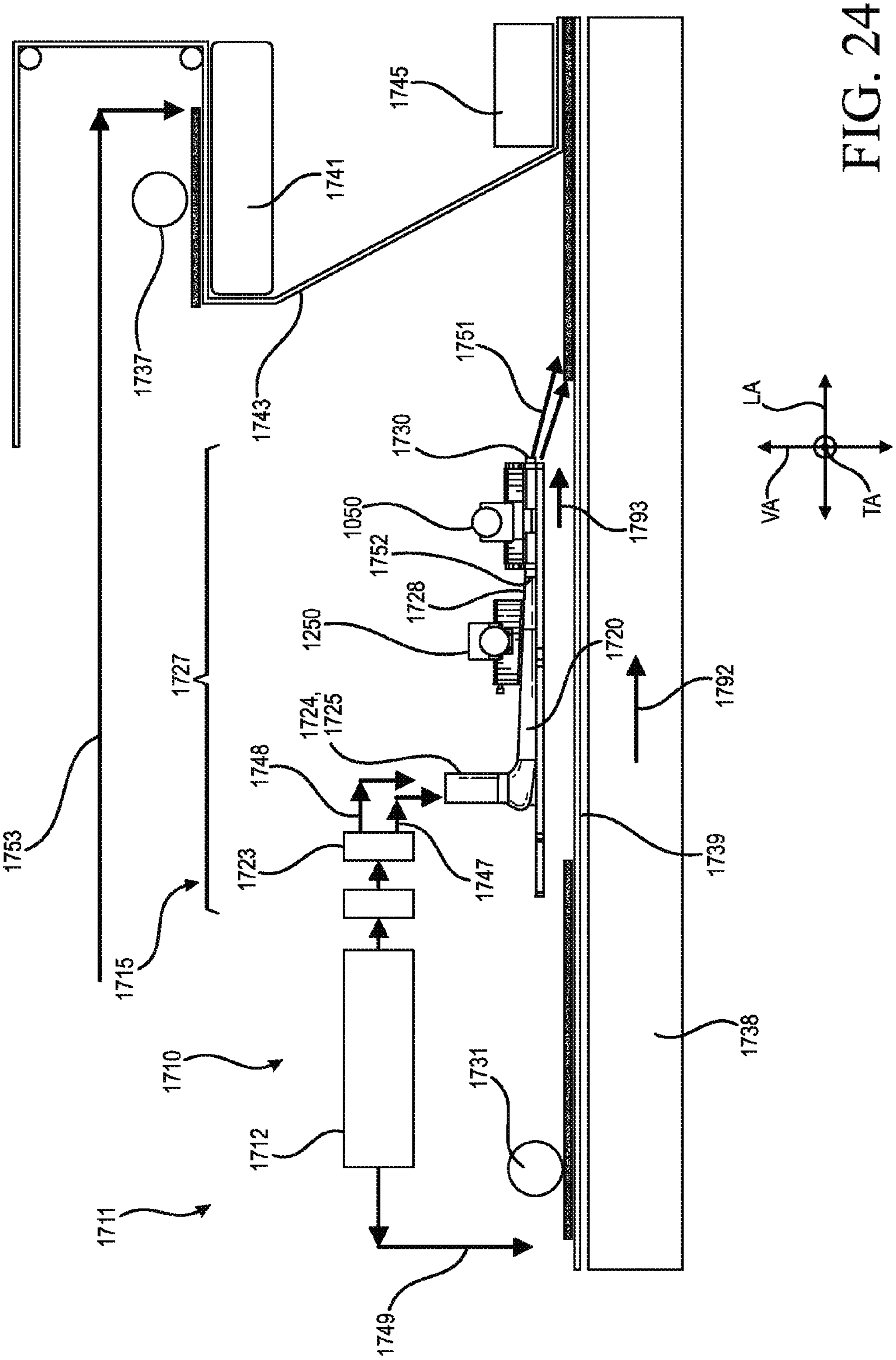
FIG. 24 is a schematic elevational diagram of an embodiment of a wet end of a gypsum wallboard manufacturing line including an embodiment of a slurry dispensing system constructed in accordance with principles of the present disclosure.

In embodiments, a slurry dispensing system constructed in accordance with principles of the present disclosure can be placed in fluid communication with a slurry mixer, for example, as shown in FIGS. 23 and 24, to produce a cementitious slurry. In embodiments, the slurry dispensing system can be placed in fluid communication with the mixer by being attached directly to the mixer and/or as part of the discharge conduit attached to, and in fluid communication with, the mixer.

In one embodiment, a cementitious slurry mixing and dispensing system includes a mixer, a discharge conduit, and a pulser assembly. The mixer is adapted to agitate water and a cementitious material to form aqueous cementitious slurry. The discharge conduit is in fluid communication with the mixer.

The discharge conduit is made from a resiliently flexible material. The discharge conduit extends along a longitudinal axis and has a sidewall portion and an interior wall surface. The interior wall surface defines a slurry passage adapted to convey aqueous cementitious slurry therethrough.

The pulser assembly includes a compression member and a drive mechanism. The compression member extends along the longitudinal axis and is reciprocally movable over a range of travel between a neutral position, in which the compression member contactingly engages the sidewall portion of the discharge conduit, and a compressed position, in which the compression member is in compressing engagement with the discharge conduit such that a portion of the interior wall surface underlying the sidewall portion is flexed. The sidewall portion is more flexed when the compression member is in the compressed position than when in the neutral position. The drive mechanism is adapted to reciprocally move the compression member over the range of travel between the neutral position and the compressed position.

Referring to FIG. 23, an embodiment of a cementitious slurry mixing and dispensing system 1510 constructed in accordance with principles of the present disclosure is shown. The cementitious slurry mixing and dispensing assembly 1510 includes a slurry mixer 1520 in fluid communication with a slurry dispensing system 1525.

The slurry mixer 1520 is adapted to agitate water and a cementitious material to form aqueous cementitious slurry. Both the water and the cementitious material can be supplied to the mixer 1520 via one or more inlets as is known in the art. In embodiments, any other suitable slurry additive can be supplied to the mixer 1520 as is known in the art of manufacturing cementitious products. Any suitable mixer (e.g., a pin mixer as is known in the art and commercially available from a variety of sources) can be used with the slurry distribution system.

The slurry dispensing system 1525 is in fluid communication with the slurry mixer 1520. The slurry dispensing system 1525 includes a discharge conduit 1527, which has a slurry distributor 110 at a terminal end 1528 of the discharge conduit 1527, and a pulser assembly 850 as shown in FIG. 14.

The slurry distributor 110 includes a first feed inlet 224 adapted to receive a first flow of cementitious slurry, such as aqueous calcined gypsum slurry, from the slurry mixer 1520 moving in a first feed direction, a second feed inlet 225 adapted to receive a second flow of cementitious slurry, such as aqueous calcined gypsum slurry, from the slurry mixer 1520 moving in a second feed direction, and a discharge outlet 230 in fluid communication with both the first and the second feed inlets 224, 225 and adapted such that the first and second flows of aqueous calcined gypsum slurry discharge from the slurry distributor 110 through the discharge outlet 230 in an outlet flow direction substantially along a machine direction, which is substantially parallel to the longitudinal axis LA in the illustrated embodiment.

The slurry distributor 110 includes a feed conduit 222 in fluid communication with a distribution conduit 228. The feed conduit 222 includes structure therein adapted to receive the first and second flows of slurry moving in the first and second feed flow direction and redirect the slurry flow direction by a change in direction angle such that the first and second flows of slurry are conveyed into the distribution conduit 228 moving substantially in the outlet flow direction, which is substantially aligned with the machine direction. In embodiments, the first and second feed inlets 224, 225 each has an opening with a cross-sectional area, and an entry portion 252 of the distribution conduit 228 has an opening with a cross-sectional area which is greater than the sum of the cross-sectional areas of the openings of the first and second feed inlets 224, 225.

The distribution conduit 228 extends generally along the longitudinal axis LA or machine direction, which is substantially perpendicular to a transverse axis TA. The distribution conduit 228 includes the entry portion 252 and the discharge outlet 230. The entry portion 252 is in fluid communication with the first and second feed inlets 224, 225 of the feed conduit 222 such that the entry portion 252 is adapted to receive both the first and the second flows of aqueous calcined gypsum slurry therefrom. The discharge outlet 230 is in fluid communication with the entry portion 252. The discharge outlet 230 of the distribution conduit 228 extends a predetermined distance along the transverse axis TA to facilitate the discharge of the combined first and second flows of aqueous calcined gypsum slurry in the cross-machine direction or along the transverse axis TA.

The discharge conduit 1527 includes a delivery conduit 1514 that is disposed between and in fluid communication with the gypsum slurry mixer 1520 and the slurry distributor 110. The delivery conduit 1514 includes a main delivery trunk 1515, a first delivery branch 1517 in fluid communication with the first feed inlet 224 of the slurry distributor 110, and a second delivery branch 1518 in fluid communication with the second feed inlet 225 of the slurry distributor 110.

The main delivery trunk 1515 is in fluid communication with the slurry mixer 1520 and both the first and second delivery branches 1517, 1518 and is interposed between the slurry mixer 1520 and the first and second delivery branches 1517, 1518. In other embodiments, the first and second delivery branches 1517, 1518 can be in independent fluid communication with the gypsum slurry mixer 1520, and the main delivery trunk 1515 can be omitted.

In embodiments, a suitable Y-shaped flow splitter 1519 joins the main delivery trunk 1515 and the first and second delivery branches 1517, 1518. The flow splitter 1519 is disposed between the main delivery trunk 1515 and the first delivery branch 1517 and between the main delivery trunk 1515 and the second delivery branch 1518. Any suitable flow splitter 1519 can be used. In embodiments, a flow splitter as shown and described in U.S. Patent Application Publication No. US 2013/0098268 can be used. In some embodiments, the flow splitter can be adapted to help split the first and second flows of gypsum slurry such that they are substantially equal. In other embodiments, additional components can be added to help regulate the first and second flows of slurry.

The delivery conduit 1514 can be made from any suitable material and can have different shapes. In some embodiments, the delivery conduit 1514 can comprise a flexible conduit.

A foam injection system 1521 can be arranged with at least one of the mixer 1520 and the discharge conduit 1527. The foam injection system 1521 can include a foam source (e.g., such as a foam generation system configured as known in the art) and a foam supply conduit 1522.

In embodiments, any suitable foam source can be used. Preferably, the aqueous foam is produced in a continuous manner in which a stream of a mix of foaming agent and water is directed to a foam generator, and a stream of the resultant aqueous foam leaves the generator and is directed to and mixed with the cementitious slurry.

The aqueous foam supply conduit 1522 can be in fluid communication with at least one of the slurry mixer 1520 and the delivery conduit 1527. An aqueous foam from a source can be added to the constituent materials through the foam supply conduit at any suitable location downstream of the mixer and/or in the mixer itself to form a foamed cementitious slurry that is provided to the slurry distributor. In the illustrated embodiment, the foam supply conduit 1522 is disposed downstream of the slurry mixer 1520 and is associated with the main delivery trunk 1515 of the delivery conduit 1514. In the illustrated embodiment, the aqueous foam supply conduit 1522 has a manifold-type arrangement for supplying foam to a plurality of foam injection ports defined within an injection ring or block disposed at a terminal end of the foam supply conduit 1522 and associated with the delivery conduit 1514, as described in U.S. Pat. No. 6,874,930, for example.

In other embodiments, one or more foam supply conduits can be provided that is in fluid communication with the mixer 1520. In yet other embodiments, the aqueous foam supply conduit(s) can be in fluid communication with the slurry mixer 1520 alone. As will be appreciated by those skilled in the art, the means for introducing aqueous foam into the cementitious slurry in the cementitious slurry mixing and dispensing system 1510, including its relative location in the system, can be varied and/or optimized to provide a uniform dispersion of aqueous foam in the cementitious slurry to produce board that is fit for its intended purpose.

Any suitable foaming agent can be used. Preferably, the aqueous foam is produced in a continuous manner in which a stream of the mix of foaming agent and water is directed to a foam generator, and a stream of the resultant aqueous foam leaves the generator and is directed to and mixed with the slurry. Some examples of suitable foaming agents are described in U.S. Pat. Nos. 5,683,635 and 5,643,510, for example.

One or more flow-modifying elements 1523 can be associated with the delivery conduit 1514 of the discharge conduit 1527 and adapted to control the first and the second flows of aqueous calcined gypsum slurry from the gypsum slurry mixer 1520. The flow-modifying element(s) 1523 can be used to control an operating characteristic of the first and second flows of aqueous calcined gypsum slurry. In the illustrated embodiment of FIG. 23, the flow-modifying element(s) 1523 is associated with the main delivery trunk 1515. In other embodiments, at least one flow modifying element 1523 can be associated with each of the first and second delivery branches 1517, 1518. Examples of suitable flow-modifying elements 1523 include volume restrictors, pressure reducers, constrictor valves, canisters, etc., including those described in U.S. Pat. Nos. 6,494,609; 6,874,930; 7,007,914; and 7,296,919, for example.

In embodiments, the flow-modifying element 1523 is a part of the discharge conduit 1527 and is adapted to modify a flow of aqueous cementitious slurry from the mixer 1520 through the discharge conduit 1527. The flow-modifying element 1523 is disposed downstream of the foam injection body and the aqueous foam supply conduit 1522 relative to a flow direction of the flow of cementitious slurry from the mixer 1520 through the discharge conduit 1527. In embodiments, one or more flow-modifying elements 1523 can be associated with the discharge conduit 1527 and adapted to control a main flow of slurry discharged from the slurry mixer 1520. The flow-modifying element(s) 1523 can be used to control an operating characteristic of the main flow of aqueous cementitious slurry.

It is further contemplated that other discharge conduits 1527, including other discharge conduits with different slurry distributors or boots, can be used in other embodiments of a cementitious slurry mixing and dispensing system as described herein. For example, in other embodiments, the discharge conduit 1527 can include at its terminal end 1528 a slurry distributor can be similar to one of those shown and described in U.S. Patent Application Nos. 2012/0168527; 2012/0170403; 2013/0098268; 2013/0099027; 2013/0099418; 2013/0100759; 2013/0216717; 2013/0233880; and 2013/0308411. In some of such embodiments, the discharge conduit 1527 can include suitable components for splitting a main flow of cementitious slurry into two flows which are re-combined in the slurry distributor.

The pulser assembly 850 can be used to periodically pulse portions of the discharge conduit 1527, particularly sidewall portions 251, 253 of the slurry distributor 110, to help prevent the occurrence of slurry build up within the discharge conduit 1527. The pulser assembly 850 can also help support the flexible slurry distributor 110 and maintain the flow geometry within the underlying portions of the slurry distributor 110.

As one of ordinary skill in the art will appreciate, one or both of the webs of cover sheet material can be pre-treated with a very thin relatively denser layer of gypsum slurry (relative to the gypsum slurry comprising the core), often referred to as a skim coat in the art, and/or hard edges, if desired. To that end, the mixer 1520 includes a first auxiliary conduit 1529 that is adapted to deposit a stream of dense aqueous calcined gypsum slurry that is relatively denser than the first and second flows of aqueous calcined gypsum slurry delivered to the discharge conduit 1527 (i.e., a "face skim coat/hard edge stream"). The first auxiliary conduit 1529 can deposit the face skim coat/hard edge stream upon a moving web of cover sheet material upstream of a skim coat roller 1531 that is adapted to apply a skim coat layer to the moving web of cover sheet material and to define hard edges at the periphery of the moving web by virtue of the width of the roller being less than the width of the moving web as is known in the art. Hard edges can be formed from the same dense slurry that forms the thin dense layer by directing portions of the dense slurry around the ends of the roller 1531 used to apply the dense layer to the web.

The mixer 1520 can also include a second auxiliary conduit 1533 adapted to deposit a stream of dense aqueous calcined gypsum slurry that is relatively denser than the first and second flows of aqueous calcined gypsum slurry delivered to the slurry distributor (i.e., a "back skim coat stream"). The second auxiliary conduit 1533 can deposit the back skim coat stream upon a second moving web of cover sheet material upstream (in the direction of movement of the second web) of a skim coat roller 1537 that is adapted to apply a skim coat layer to the second moving web of cover sheet material as is known in the art (see FIG. 24 also).

In other embodiments, separate auxiliary conduits can be connected to the mixer to deliver one or more separate edge streams to the moving web of cover sheet material. Other suitable equipment (such as auxiliary mixers) can be provided in the auxiliary conduits 1529, 1533 to help make the slurry therein denser, such as by mechanically breaking up foam in the slurry and/or by chemically breaking down the foam through use of a suitable de-foaming agent.

In yet other embodiments, first and second delivery branches can each include a foam supply conduit therein which are respectively adapted to independently introduce aqueous foam into the first and second flows of aqueous calcined gypsum slurry delivered to the slurry distributor 110. In still other embodiments, a plurality of mixers can be provided to provide independent streams of slurry to the first and second feed inlets of a slurry distributor constructed in accordance with principles of the present disclosure. It will be appreciated that other embodiments are possible.

Referring to FIG. 24, an exemplary embodiment of a wet end 1711 of a gypsum wallboard manufacturing line is shown. The illustrated wet end 1711 includes a gypsum slurry mixing and dispensing system 1710 having a gypsum slurry mixer 1712 in fluid communication with a slurry dispensing system 1715 similar in construction and function to the slurry dispensing system of FIG. 15, a hard edge/face skim coat roller 1731 disposed upstream of the slurry dispensing system 1715 and supported over a forming table 1738 such that a first moving web 1739 of cover sheet material is disposed therebetween, a back skim coat roller 1737 disposed over a support element 1741 such that a second moving web 1743 of cover sheet material is disposed therebetween, and a forming station 745 adapted to shape the preform into a desired thickness. The skim coat rollers 1731, 1737, the forming table 1738, the support element 1741, and the forming station 1745 can all comprise conventional equipment suitable for their intended purposes as is known in the art. The wet end 1711 can be equipped with other conventional equipment as is known in the art.

Water and calcined gypsum can be agitated in the mixer 1712 to form the first and second flows 1747, 1748 of aqueous calcined gypsum slurry. In embodiments, any suitable mixer 1712 can be used, including a commercially available pin mixer known to those skilled in the art of manufacturing gypsum wallboard, for example. In some embodiments, the water and calcined gypsum can be continuously added to the mixer in a water-to-calcined gypsum ratio from about 0.5 to about 1.3, and in other embodiments of about 0.75 or less.

Gypsum board products are typically formed “face down” such that the advancing web 1739 serves as the “face” cover sheet of the finished board. A face skim coat/hard edge stream 1749 (a layer of denser aqueous calcined gypsum slurry relative to at least one of the first and second flows of aqueous calcined gypsum slurry) can be applied to the first moving web 1739 upstream of the hard edge/face skim coat roller 1731, relative to the machine direction 1792, to apply a skim coat layer to the first web 1739 and to define hard edges of the board.

The first flow 1747 and the second flow 1748 of aqueous calcined gypsum slurry are respectively passed through the first feed inlet 1724 and the second feed inlet 1725 of the slurry distributor 1720 of the discharge conduit 1727. The first and second flows 1747, 1748 of aqueous calcined gypsum slurry are combined in the slurry distributor 1720 of the discharge conduit 1727. The first and second flows 1747, 1748 of aqueous calcined gypsum slurry move along a flow path through the slurry distributor 1720 in the manner of a streamline flow, undergoing minimal or substantially no air-liquid slurry phase separation and substantially without undergoing a vortex flow path.

The first moving web 1739 moves along the longitudinal axis LA in the machine direction 1739. The first flow 1747 of aqueous calcined gypsum slurry passes through the first feed inlet 1724, and the second flow 1748 of aqueous calcined gypsum slurry passes through the second feed inlet 1725. The distribution conduit 1728 is positioned such that it extends along the longitudinal axis LA which substantially coincides with the machine direction 1792 along which the first web 1739 of cover sheet material moves. Preferably, the central midpoint of the discharge outlet 1730 (taken along the transverse axis/cross-machine direction TA) substantially coincides with the central midpoint of the first moving cover sheet 1739. The first and second flows 1747, 1748 of aqueous calcined gypsum slurry combine in the slurry distributor 1720 such that the combined first and second flows 1751 of aqueous calcined gypsum slurry pass through the discharge outlet 1730 in a distribution direction 1793 generally along the machine direction 1792.

In some embodiments, the distribution conduit 1728 is positioned such that it is substantially parallel to the plane defines by the longitudinal axis LA and the transverse axis TA of the first web 1739 moving along the forming table. In other embodiments, the entry portion 1752 of the distribution conduit 1728 can be disposed vertically lower or higher than the discharge outlet 1730 relative to the first web 1739.

The combined first and second flows 1751 of aqueous calcined gypsum slurry are discharged from the discharge conduit 1727 upon the first moving web 1739. The face skim coat/hard edge stream 1749 can be deposited from the mixer 1712 at a point upstream, relative to the direction of movement of the first moving web 1739 in the machine direction 1792, of where the first and second flows 1747, 1748 of aqueous calcined gypsum slurry are discharged from the slurry distributor 1720 upon the first moving web 1739. The combined first and second flows 1747, 1748 of aqueous calcined gypsum slurry can be discharged from the slurry distributor 1720 with a reduced momentum per unit width along the cross-machine direction relative to a conventional boot design to help prevent “washout” of the face skim coat/hard edge stream 1749 deposited on the first moving web 1739 (i.e., the situation where a portion of the deposited skim coat layer is displaced from its position upon the moving web 339 in response to the impact of the slurry from the discharge outlet 1730 being deposited upon it).

The first and second flows 1747, 1748 of aqueous calcined gypsum slurry respectively passed through the first and second feed inlets 1724, 1725 of the slurry distributor 1720 can be selectively controlled with at least one flow-modifying element 1723. For example, in some embodiments, the first and second flows 1747, 1748 of aqueous calcined gypsum slurry are selectively controlled such that the average velocity of the first flow 1747 of aqueous calcined gypsum slurry passing through the first feed inlet 1724 and the average velocity of the second flow 1748 of aqueous calcined gypsum slurry passing through the second feed inlet 1725 are substantially the same.

In embodiments, the first flow 1747 of aqueous calcined gypsum slurry is passed at an average first feed velocity through the first feed inlet 1724 of the slurry distributor 1720 of the discharge conduit 1727. The second flow 1748 of aqueous calcined gypsum slurry is passed at an average second feed velocity through the second feed inlet 1725 of the slurry distributor 1720 of the discharge conduit 1727. The second feed inlet 1725 is in spaced relationship to the first feed inlet 1724. The first and second flows 1751 of aqueous calcined gypsum slurry are combined in the slurry distributor 1720. The combined first and second flows 1751 of aqueous calcined gypsum slurry are discharged at an average discharge velocity from the discharge outlet 1730 of the slurry distributor 1720 upon the web 1739 of cover sheet material moving along a machine direction 1792. The average discharge velocity is less than the average first feed velocity and the average second feed velocity.

The combined first and second flows 1751 of aqueous calcined gypsum slurry are discharged from the discharge conduit 1727 through the discharge outlet 1730. The opening of the discharge outlet 1730 can have a width extending along the transverse axis TA and sized such that the ratio of the width of the first moving web 1739 of cover sheet material to the width of the opening of the distribution outlet 1730 is within a range including and between about 1:1 and about 6:1. In some embodiments, the ratio of the average velocity of the combined first and second flows 1751 of aqueous calcined gypsum slurry discharging from the discharge conduit 1727 to the velocity of the moving web 1739 of cover sheet material moving along the machine direction 1792 can be about 2:1 or less in some embodiments, and from about 1:1 to about 2:1 in other embodiments.

The combined first and second flows 1751 of aqueous calcined gypsum slurry discharging from the discharge conduit 1727 form a spread pattern upon the moving web 1739. At least one of the size and shape of the discharge outlet 1730 can be adjusted with a profiling mechanism of the slurry dispensing system 1715, which in turn can change the spread pattern.

Thus, slurry is fed into both feed inlets 1724, 1725 of the feed conduit 1722 and then exits through the discharge outlet 1730 with an adjustable gap. Side-to-side flow variation and/or any local variations can be reduced by performing cross-machine (CD) profiling control at the discharge outlet 1730 using the profiling system. The slurry dispensing system 1715 can help prevent air-liquid slurry separation in the slurry resulting in a more uniform and consistent material delivered to the forming table 1738.

The pulser assemblies 1050, 1250 of the slurry dispensing system 1715 can help prevent buildup inside the slurry distributor 1720 by periodically pulsing engaged portions of the discharge conduit 1727. The pulser assemblies 1050, 1250 can help maintain the flow geometry inside the slurry distributor 1720 to help prevent phase separation in the cementitious slurry.

A back skim coat stream 1753 (a layer of denser aqueous calcined gypsum slurry relative to at least one of the first and second flows 1747, 1748 of aqueous calcined gypsum slurry) can be applied to the second moving web 1743. The back skim coat stream 1753 can be deposited from the mixer 1712 at a point upstream, relative to the direction of movement of the second moving web 1743, of the back skim coat roller 1737.

The second moving web 1743 of cover sheet material can be placed upon the combined flow 1751 deposited upon the advancing first web 1756 to form a sandwiched wallboard preform that is fed to the forming station 1745 to shape the preform to a desired thickness. In embodiments, aqueous foam or other agents can be added to the slurry comprising the face skim coat and/or back skim coat to reduce its density, but at a density that is greater than the foamed slurry dispensed from the slurry dispensing system 1715.

In another aspect of the present disclosure, a slurry dispensing system constructed in accordance with principles of the present disclosure can be used in a variety of manufacturing processes. For example, in one embodiment, a slurry dispensing system can be used in a method of preparing a cementitious product, such as gypsum wallboard, for example.

In an embodiment, a method of preparing a cementitious product can be performed using a slurry dispensing system constructed according to principles of the present disclosure. Embodiments of a method of preparing a cementitious product, such as a gypsum product, in accordance with principles of the present disclosure can include depositing an aqueous calcined gypsum slurry upon an advancing web using a slurry dispensing system constructed in accordance with principles of the present disclosure.

In one embodiment of a method of preparing a cementitious product, a flow of aqueous cementitious slurry is discharged from a mixer. The flow of aqueous cementitious slurry is passed through a feed inlet of a slurry distributor into a slurry passageway defined within the slurry distributor. A portion of the slurry distributor is periodically compressed such that an interior flow geometry of the slurry passageway defined within the portion of the slurry distributor is modified.

In embodiments of a method of preparing a cementitious product, periodically compressing the sidewall portion comprises periodically compressing a pair of sidewall portions of the discharge conduit. The pair of sidewall portions is aligned longitudinally and in lateral spaced relationship with respect to each other.

In embodiments of a method of preparing a cementitious product, the discharge conduit includes a discharge outlet opening extending between the pair of sidewalls. The discharge outlet opening has a width, along a transverse axis between the pair of sidewalls, and a height, along a vertical axis which is perpendicular to the transverse axis. The discharge outlet opening of the discharge conduit has a width-to-height ratio of about four or more. In embodiments of a method of preparing a cementitious product, the sidewall portion comprises a first sidewall portion disposed adjacent a discharge outlet opening of the discharge conduit. The method further comprises periodically compressing a second sidewall portion of the discharge conduit such that a portion of the interior wall surface underlying the second sidewall portion is flexed. The second sidewall portion is in spaced longitudinal relationship along the discharge conduit with respect to the first sidewall portion. In some of such embodiments, the first sidewall portion and the second sidewall portion are both periodically compressed by a drive mechanism in a reciprocal manner. The second sidewall portion is compressed out of phase with respect to the compression of the first sidewall portion.

In embodiments of a method of preparing a cementitious product, the compression member is periodically maintained in a neutral position in a dwell period between periodic compressions. The compression member, when in the neutral position, contactingly supports the discharge conduit such that an interior flow geometry of a portion of the slurry passage underlying the compression member is maintained in a configuration.

In embodiments of a method of preparing a cementitious product, the sidewall portion is periodically compressed by a compression member. The compression member includes a contacting surface having a compression member topography. The method further includes periodically maintaining the compression member in a neutral position in a dwell period between periodic compressions. The flow of aqueous cementitious slurry is passed through the slurry passage at a pressure sufficient to expand the discharge conduit outward such that the compression member, when in a neutral position, contactingly supports the discharge conduit such that an underlying portion of the interior wall surface of the discharge conduit defining the slurry passage substantially conforms to the shape of the compression member topography of the contacting surface of the compression member.

Embodiments of a slurry dispensing system, a cementitious slurry mixing and dispensing system, and methods of using the same are provided herein which can provide many enhanced process features helpful in manufacturing cementitious products, such as gypsum wallboard, in a commercial setting. A slurry dispensing system constructed in accordance with principles of the present disclosure can facilitate the discharge of aqueous calcined gypsum slurry upon a moving web of cover sheet material as it advances past a mixer at the wet end of the manufacturing line toward a forming station. The principles for reducing buildup within a discharge conduit disclosed herein can be applied in a cementitious article production environment to operate with reduced downtime as a result of problems caused by set cementitious material breaking free from within the discharge conduit.

All references cited herein are hereby incorporated by reference to the same extent as if each reference were individually and specifically indicated to be incorporated by reference and were set forth in its entirety herein.

The use of the terms “a” and “an” and “the” and similar referents in the context of describing the invention (especially in the context of the following claims) are to be construed to cover both the singular and the plural, unless otherwise indicated herein or clearly contradicted by context. The terms “comprising,” “having,” “including,” and “containing” are to be construed as open-ended terms (i.e., meaning “including, but not limited to,”) unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., “such as”) provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A cementitious slurry mixing and dispensing system comprising:

a mixer, the mixer adapted to agitate water and a cementitious material to form aqueous cementitious slurry;

a discharge conduit, the discharge conduit in fluid communication with the mixer, the discharge conduit made from a resiliently flexible material, the discharge conduit extending along a longitudinal axis and having a sidewall portion and an interior wall surface, the interior wall surface defining a slurry passage adapted to convey aqueous cementitious slurry therethrough; and a pulser assembly, the pulser assembly including a compression member and a drive mechanism, the compression member extending along the longitudinal axis and being reciprocally movable over a range of travel between a neutral position, in which the compression member contactingly engages the sidewall portion of the discharge conduit, and a compressed position, in which the compression member is in compressing engagement with the discharge conduit such that a portion of the interior wall surface underlying the sidewall portion is flexed, the sidewall portion being more flexed when the compression member is in the compressed position than when in the neutral position, and the drive mechanism being adapted to reciprocally move the compression member over the range of travel between the neutral position and the compressed position.

2. The cementitious slurry mixing and dispensing system of claim 1, wherein the discharge conduit includes a discharge outlet opening having a width, along a transverse axis which is perpendicular to the longitudinal axis, and a height, along a vertical axis which is mutually perpendicular to the longitudinal axis and the transverse axis, wherein the discharge outlet opening of the discharge conduit has a width-to-height ratio of about 4 or more.

3. The cementitious slurry mixing and dispensing system of claim 2, wherein the discharge conduit includes a slurry distributor disposed at a terminal end of the discharge conduit, the slurry distributor including the discharge outlet opening.

4. The cementitious slurry mixing and dispensing system of claim 1, wherein the compression member includes a longitudinally extending slot extending between a cam surface and a contacting surface thereof, the slot configured such that a segment of the sidewall portion of the discharge conduit in contacting engagement with the compression member is accessible from the cam surface of the compression member.

5. The cementitious slurry mixing and dispensing system of claim 1, wherein the compression member, when in the neutral position, contactingly supports the discharge conduit such that an interior flow geometry of a portion of the slurry passage underlying the compression member is maintained in a configuration.

6. The cementitious slurry mixing and dispensing system of claim 1, wherein the compression member includes a contacting surface having a compression member topography, the contacting surface of the compression member in contacting engagement with an exterior surface of the sidewall portion of the discharge conduit, the compression member, when in the neutral position, contactingly supporting the discharge conduit such that an underlying portion of the interior wall surface of the discharge conduit defining the slurry passage substantially conforms to the shape of the compression member topography when cementitious slurry passes through the slurry passage of the discharge conduit at or above a given pressure.

7. The cementitious slurry mixing and dispensing system of claim 1, wherein the compression member includes a contacting surface having a compression member topography, and the sidewall portion of the discharge conduit has an exterior sidewall surface with a discharge conduit sidewall topography, the contacting surface of the compression member in contacting engagement with the exterior sidewall surface of the sidewall portion of the discharge conduit, and the compression member topography of the contacting surface of the compression member substantially corresponding with the discharge conduit sidewall topography of the exterior sidewall surface of the sidewall portion of the discharge conduit.

8. The cementitious slurry mixing and dispensing system of claim 1, wherein the drive mechanism include a shaft journaled for rotation about a longitudinal shaft axis thereof and an eccentric cam mounted to the shaft, the eccentric cam in engaging contact with the compression member such that a revolution of the eccentric cam reciprocally moves the compression member over the range of travel.

9. The cementitious slurry mixing and dispensing system of claim 8, wherein the drive mechanism includes at least one of a crank handle and a motor coupled to an end of the shaft to selectively rotate the shaft and the eccentric cam about the longitudinal shaft axis.

10. The cementitious slurry mixing and dispensing system of claim 1, wherein the sidewall portion of the discharge conduit comprises a first sidewall portion, and the discharge conduit includes a second sidewall portion in spaced lateral relationship to the first sidewall portion, the compression member comprises a first compression member, and the pulser assembly includes a second compression member, the second compression member extending along the longitudinal axis and contactingly engaging the second sidewall portion of the discharge conduit, and the drive mechanism adapted to selectively move the second compression member into compressing engagement with the discharge conduit such that a portion of the interior wall surface underlying the second sidewall portion is flexed.

11. The cementitious slurry mixing and dispensing system of claim 10, wherein the first and second compression members are each movable over a respective range of travel between a neutral position and a compressed position, and the drive mechanism is adapted to reciprocally move the first and second compression members over the range of travel between the neutral position and the compressed position, the interior wall surface underlying the respective first and second sidewall portions being more flexed when the first and second compression members are respectively in the compressed position than when in the neutral position.

12. The cementitious slurry mixing and dispensing system of claim 11, wherein the drive mechanism is adapted to reciprocally move the first and second compression members in substantial synchronization over the range of travel.

13. The cementitious slurry mixing and dispensing system of claim 11, wherein the drive mechanism include a shaft journaled for rotation about a longitudinal shaft axis thereof and first and second eccentric cam mounted to the shaft, the first and second eccentric cams in respective engaging contact with the first and second compression members such that a revolution of the shaft causes the first and second eccentric cams to reciprocally move the first and second compression members, respectively, over the range of travel.

14. The cementitious slurry mixing and dispensing system of claim 1, wherein the pulser assembly comprises a first pulser assembly, and the system further comprises:

a second pulser assembly, the second pulser assembly disposed in spaced relationship with the first pulser assembly along the longitudinal axis of the discharge conduit, the second pulser assembly including a compression member and a drive mechanism, the compression member of the second pulser assembly contactingly engaging a second portion of the discharge conduit, and the drive mechanism of the second pulser assembly adapted to selectively move the compression member of the second pulser assembly into compressing engagement with the second portion of the discharge conduit such that a portion of the interior wall surface underlying the second portion of the discharge conduit is flexed.

15. The cementitious slurry mixing and dispensing system of claim 14, wherein the drive mechanisms of the first and second pulser assemblies are adapted to reciprocally move the compression member of the second pulser assembly in substantial alternating fashion with respect to the compression member of the first pulser assembly.

16. The cementitious slurry mixing and dispensing system of claim 14, wherein the discharge conduit includes a slurry distributor disposed at a terminal end of the discharge conduit, the slurry distributor including a feed conduit and a distribution conduit, the feed conduit including a first feed portion segment with a first feed inlet, a second feed portion with a second feed inlet disposed in spaced relationship to the first feed inlet, and a connector segment disposed between the first feed portion and the second feed portion, the first feed inlet adapted to receive a first flow of aqueous cementitious slurry from the mixer, the second feed inlet adapted to receive a second flow of aqueous cementitious slurry from the mixer, the distribution conduit having the discharge outlet opening and being in fluid communication with both the first feed inlet and the second feed inlet, the distribution conduit adapted such that combined first and second flows of aqueous cementitious slurry discharge from the slurry distributor through the discharge outlet opening, the first pulser assembly being disposed adjacent the discharge outlet opening, and the second pulser assembly includes first and second side compression members disposed in overlying, contacting relationship with portions of the first and second feed portions, respectively, and an intermediate compression member, disposed between the first and second side compression members and in overlying, contacting relationship with the connector segment of the slurry distributor.

17. The cementitious slurry mixing and dispensing system of claim 16, wherein the discharge conduit includes a delivery conduit disposed between and in fluid communication with the mixer and the slurry distributor, the delivery conduit including a main delivery trunk and first and second delivery branches, a flow splitter joining the main delivery trunk and the first and second delivery branches, the flow splitter disposed between the main delivery trunk and the first delivery branch and between the main delivery trunk and the second delivery branch, the first delivery branch being in fluid communication with the first feed inlet of the slurry distributor, and the second delivery branch being in fluid communication with the second feed inlet of the slurry distributor.

18. The cementitious slurry mixing and dispensing system of claim 16, wherein the drive mechanism of the second pulser assembly is adapted to reciprocally move the first and second side compression members and the intermediate compression member such that the first and second side compression members move in substantial synchronization with respect to each other and out of phase with respect to the intermediate compression member.

19. The cementitious slurry mixing and dispensing system of claim 18, wherein the drive mechanism of the second pulser assembly includes a shaft journaled for rotation about a longitudinal shaft axis thereof, first and second side eccentric cams mounted to the shaft, and an intermediate cam mounted to the shaft and interposed between the first and second side eccentric cams, the first and second side eccentric cams being in respective contacting arrangement with the first and second side compression members and the intermediate eccentric cam being in contacting arrangement with the intermediate compression member such that a revolution of the shaft reciprocally moves the first and second compression members in substantial synchronization and the intermediate compression member out of phase with respect to the first and second side compression members.

20. The cementitious slurry mixing and dispensing system of claim 1, further comprising:

an aqueous foam supply conduit in fluid communication with at least one of the mixer and the discharge conduit;

a flow-modifying element associated with the discharge conduit and adapted to modify a flow of aqueous cementitious slurry from the mixer through the discharge conduit, the flow-modifying element being disposed downstream of the aqueous foam supply conduit relative to a flow direction of the flow of cementitious slurry from the mixer through the discharge conduit.

* * * * *